United States Patent [19]
Folsom et al.

[11] Patent Number: 6,085,521
[45] Date of Patent: Jul. 11, 2000

[54] CONCENTRIC AXIAL PISTON TRANSMISSION

[75] Inventors: Lawrence R. Folsom; Clive Tucker, both of Pittsfield, Mass.

[73] Assignee: Folsom Technologies, Inc., Pittsfield, Mass.

[21] Appl. No.: 09/058,719

[22] Filed: Apr. 10, 1998

[51] Int. Cl.$^7$ .................................................. F16D 39/00
[52] U.S. Cl. .............................................. 60/490; 60/492
[58] Field of Search ....................................... 60/490, 492

[56] References Cited

U.S. PATENT DOCUMENTS

| | | |
|---|---|---|
| 1,840,865 | 1/1932 | Rayburn et al. ........................... 60/453 |
| 2,678,536 | 5/1954 | Morgan . |
| 3,161,023 | 12/1964 | Margolin et al. . |
| 4,901,529 | 2/1990 | Iino et al. . |
| 4,967,556 | 11/1990 | Inour . |

*Primary Examiner*—Edward K. Look
*Assistant Examiner*—Hermos Rodriguez
*Attorney, Agent, or Firm*—J. Michael Neary

[57] ABSTRACT

A continuously variable transmission includes a housing enclosing an axial piston pump and an axial piston motor arranged concentrically with respect to the pump. The pump and motor have cylinder blocks with axial cylinders, each receiving a piston. Pump and motor swash plates are engaged with the pump and motor pistons for rotating and nutating relative to the cylinder blocks to convert between fluid pressure power and rotating mechanical power. Input and output shafts are journaled in the housing for rotation about a central axis and have inner ends coupled to the pump and to the motor swash plate, respectively. Fluid passages between the pump cylinder block and the motor cylinder block convey fluid pressurized in the pump to the motor cylinders and convey spent fluid displaced from the motor cylinder block back to the pump cylinders. A mechanism changes the angle of the motor swash plate and the angle of the pump swash plate relative to the central axis under automatic or operator control to vary the transmission control for operation of the vehicle. The input shaft exerts a first component of torque through the pump to the pump swash plate and thence to the output swash plate and the output shaft, and the fluid pressurized in the pump drives the motor pistons against the output swash plate to exert a second component of torque thereon in the same direction as the first component, combining in a variable ratio to produce output torque in the output shaft.

14 Claims, 22 Drawing Sheets

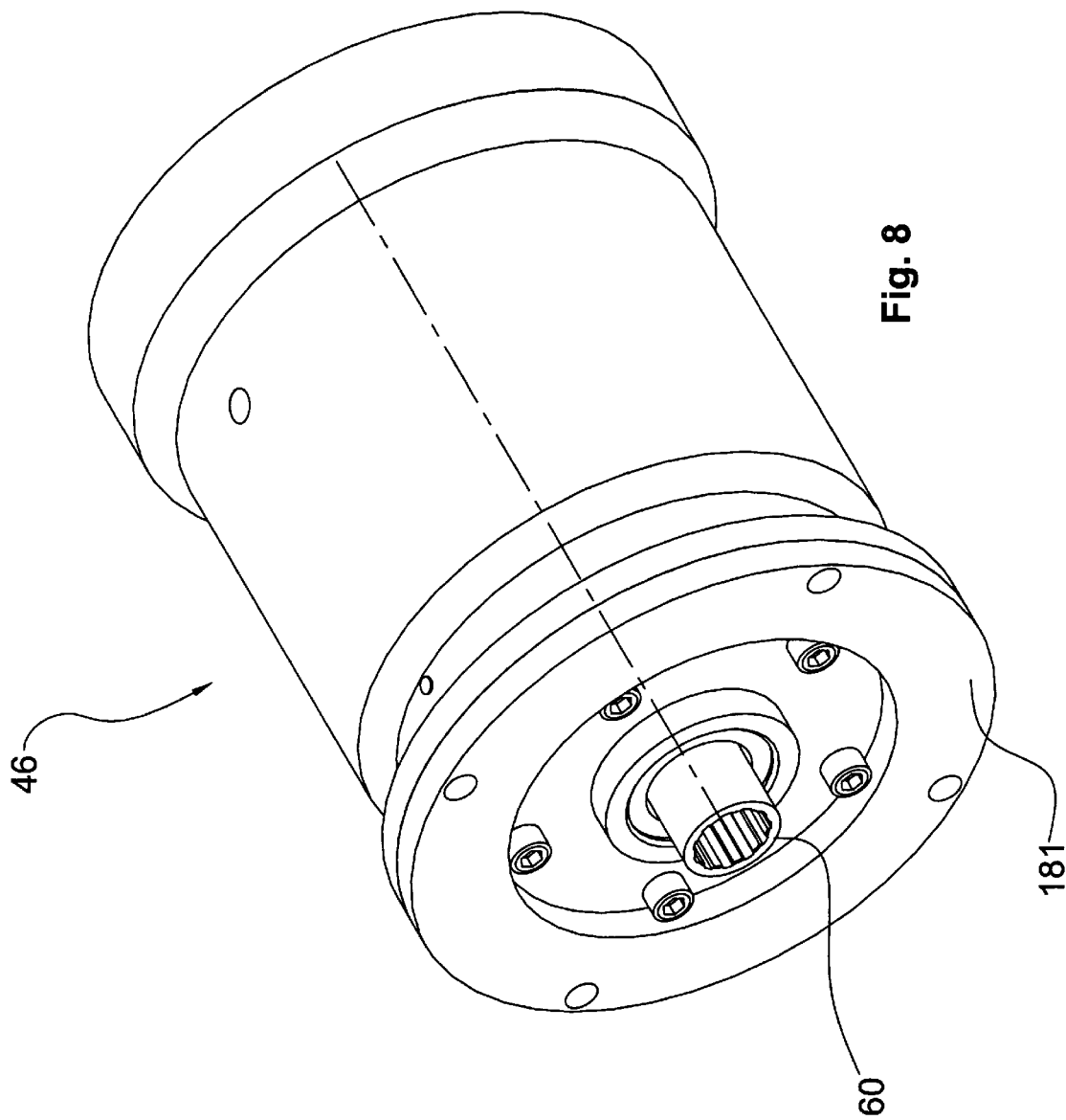

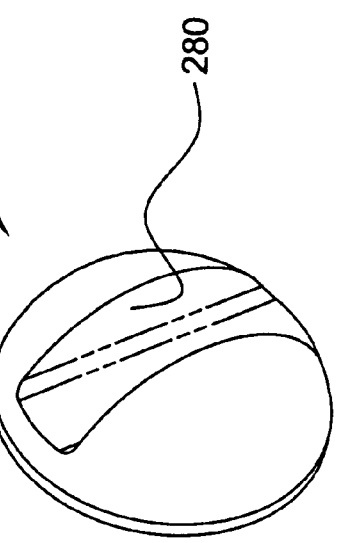
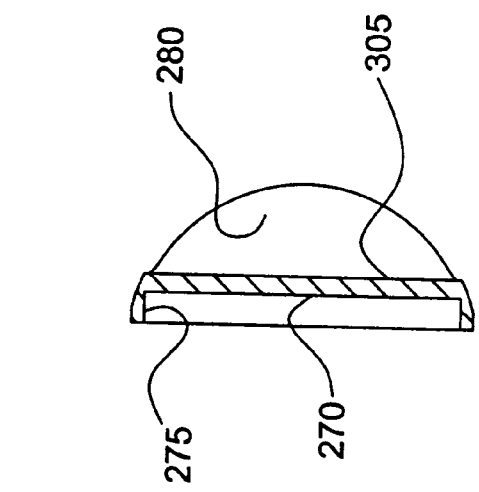
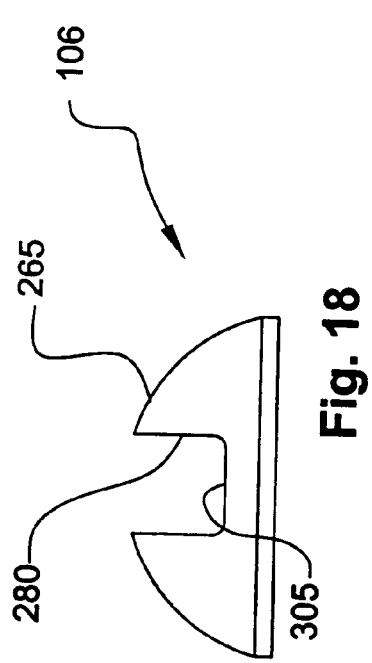
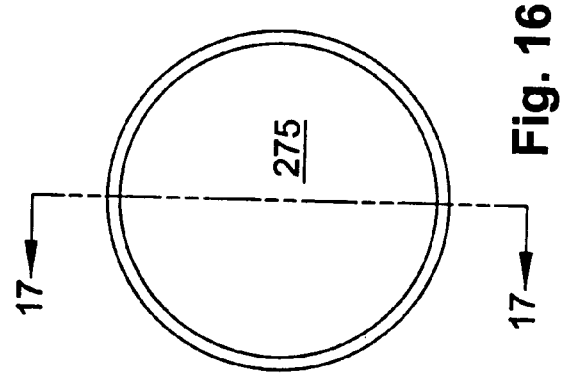

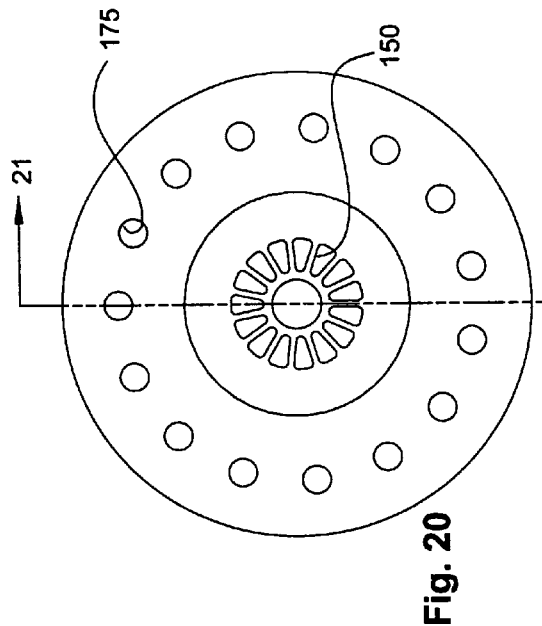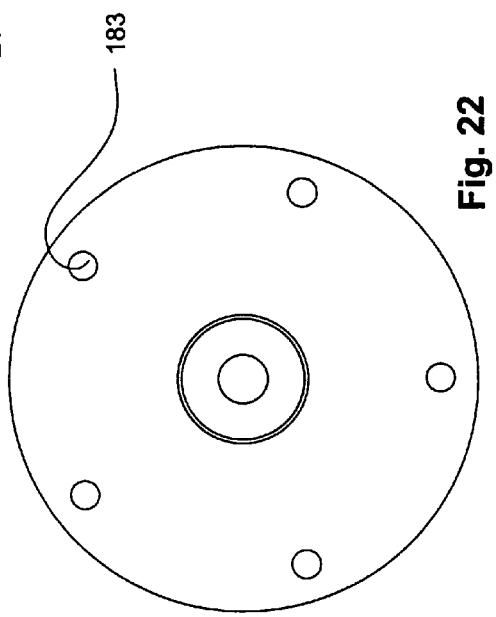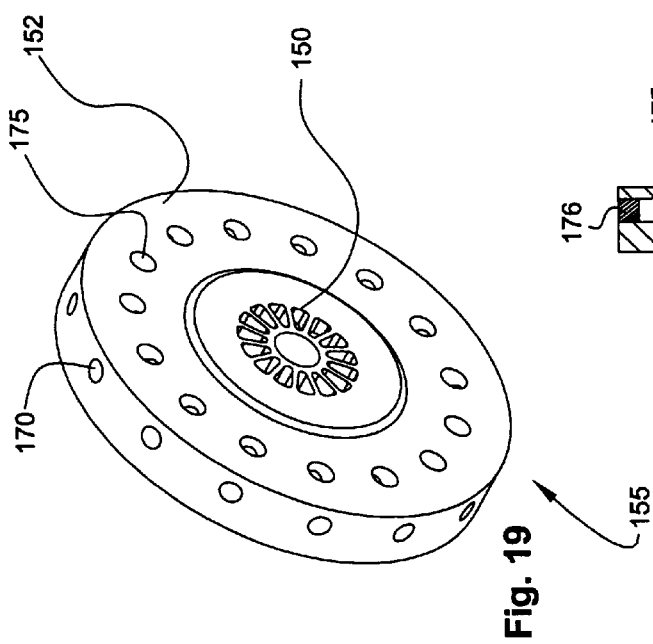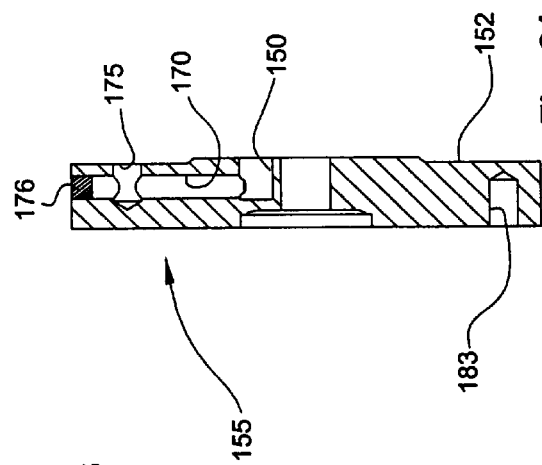

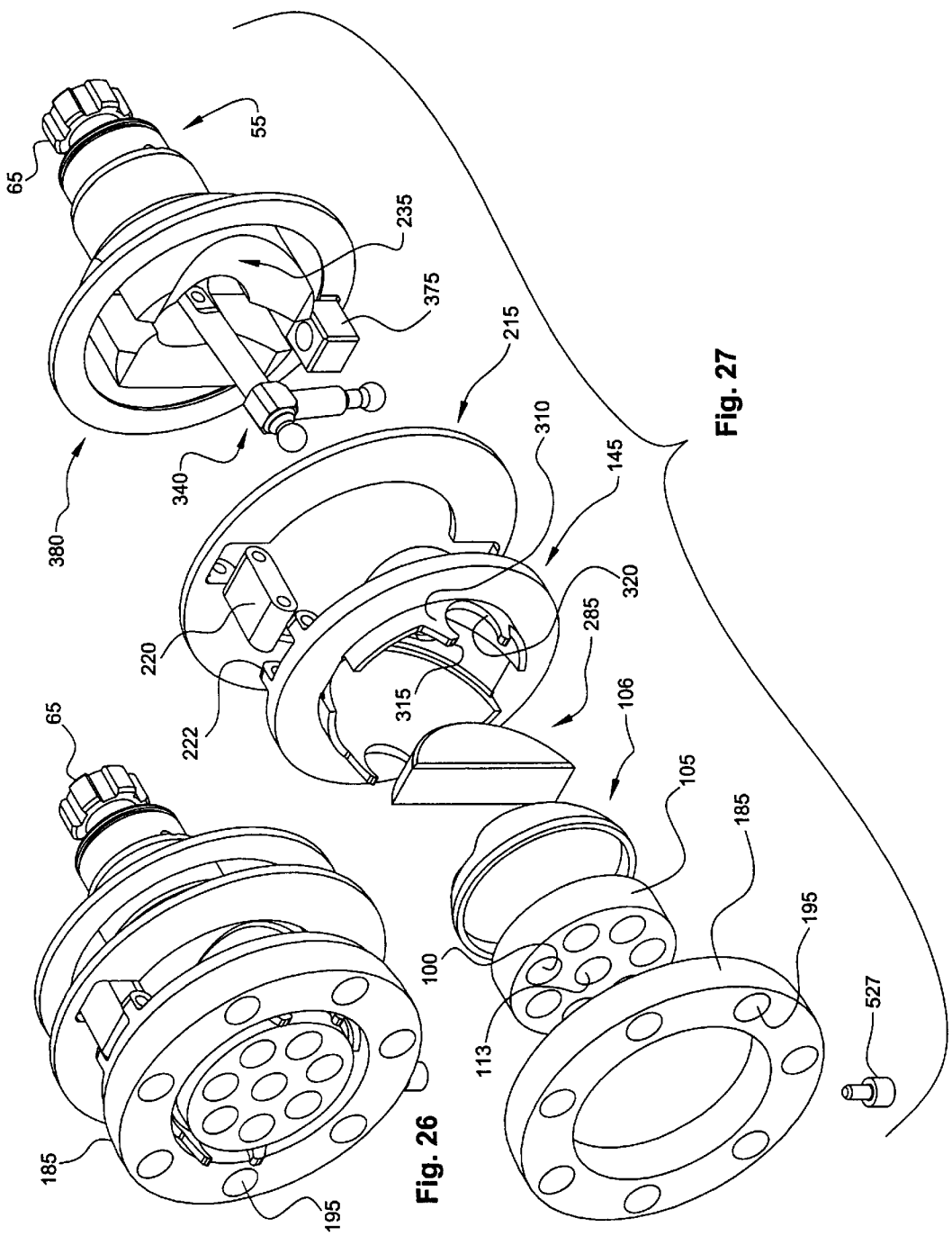

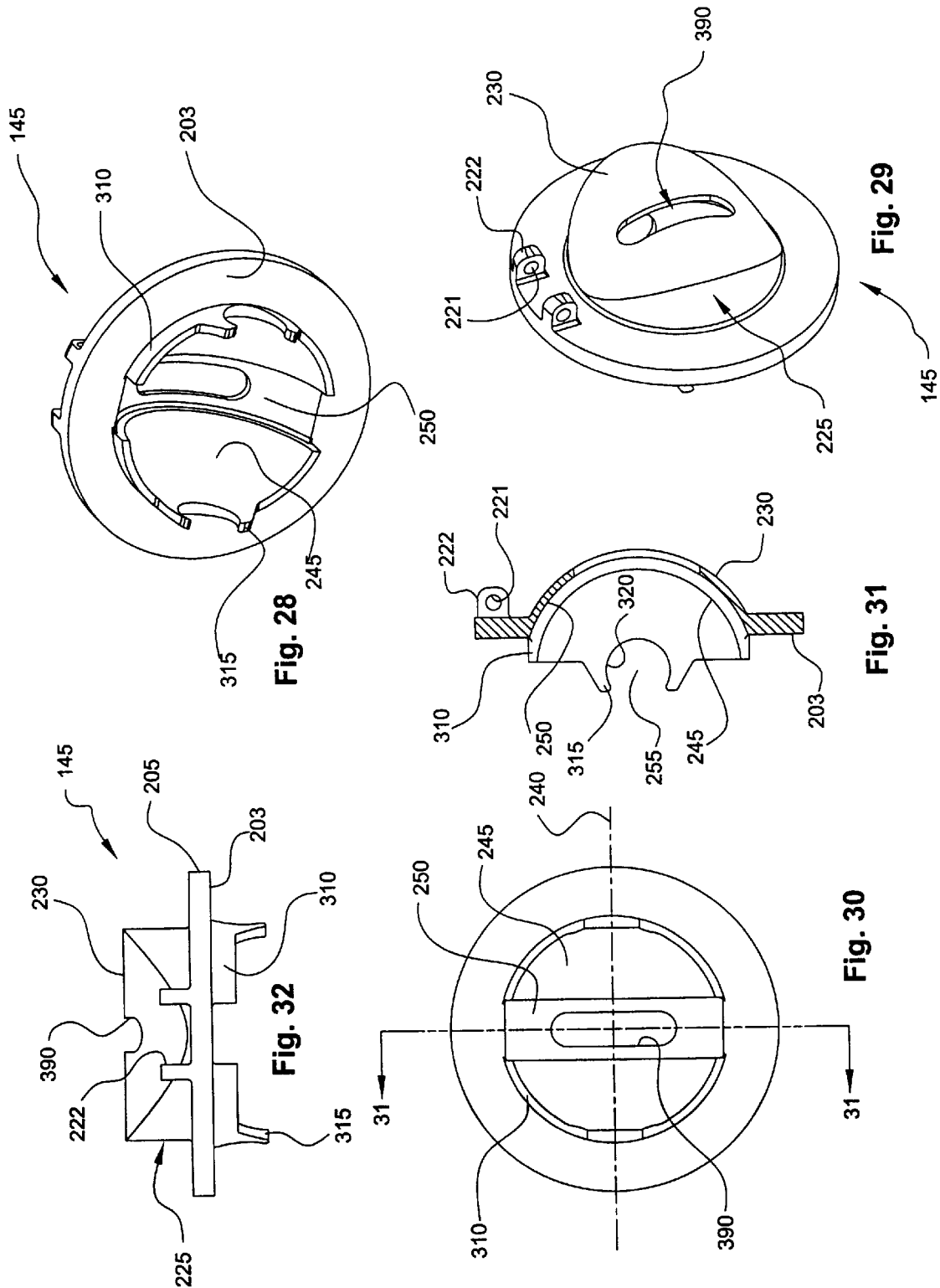

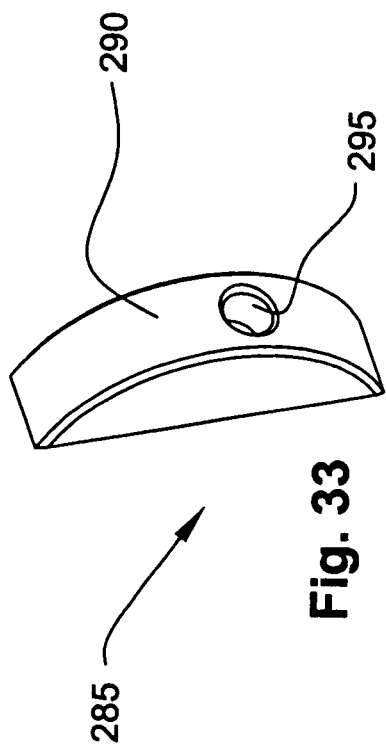
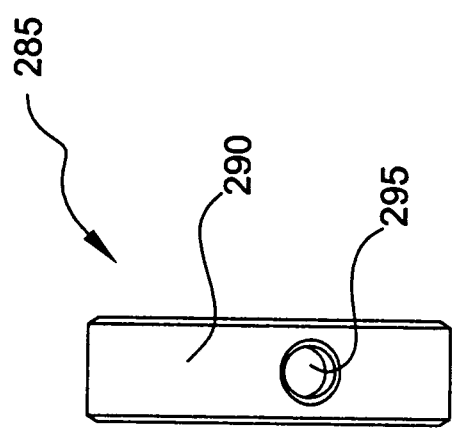
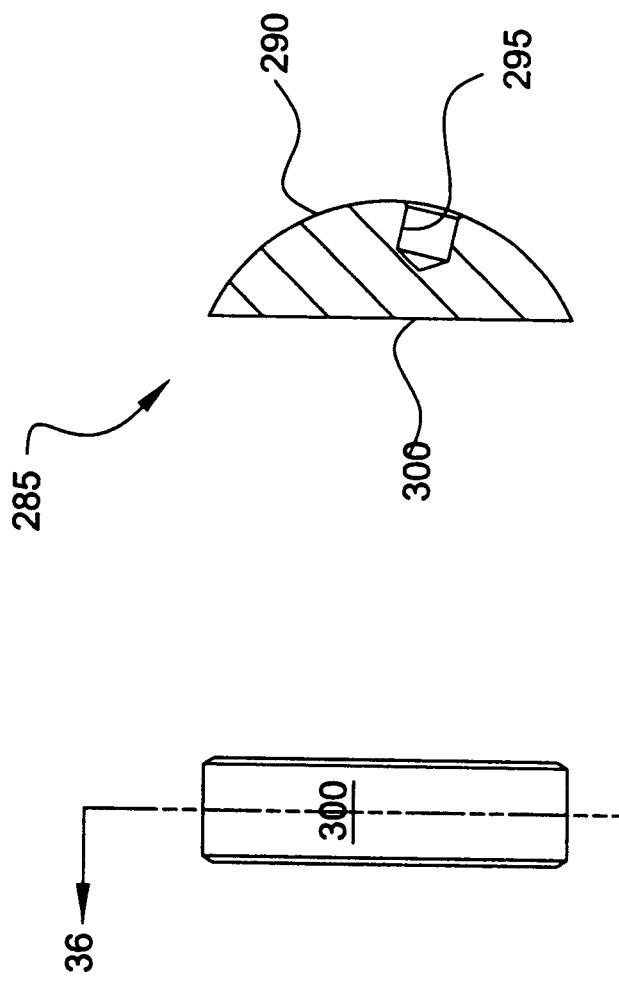

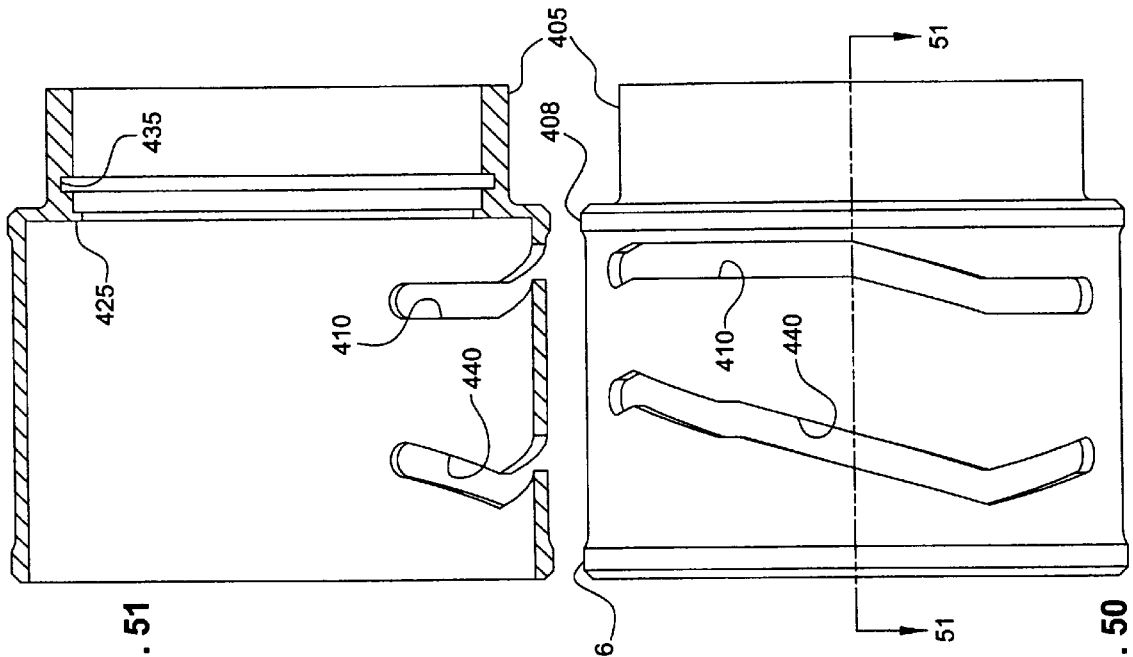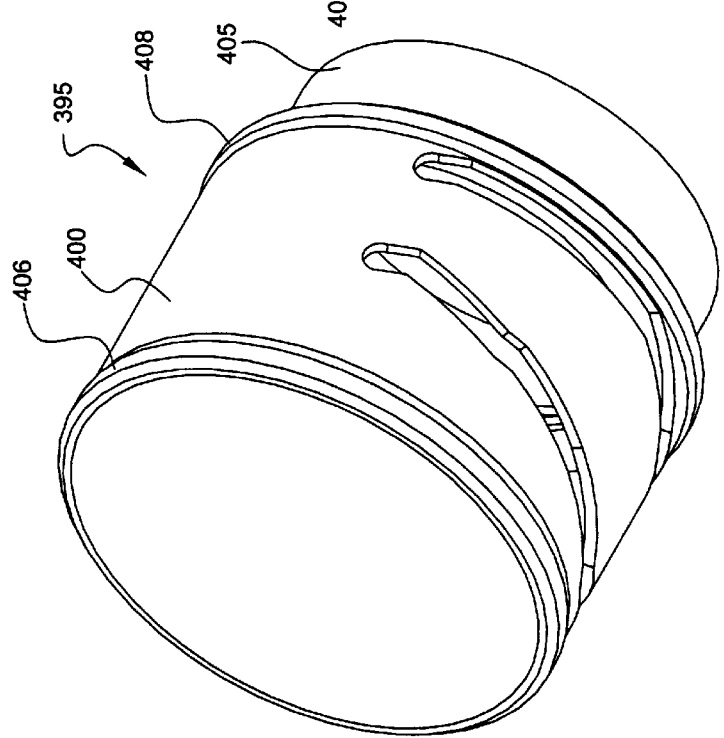

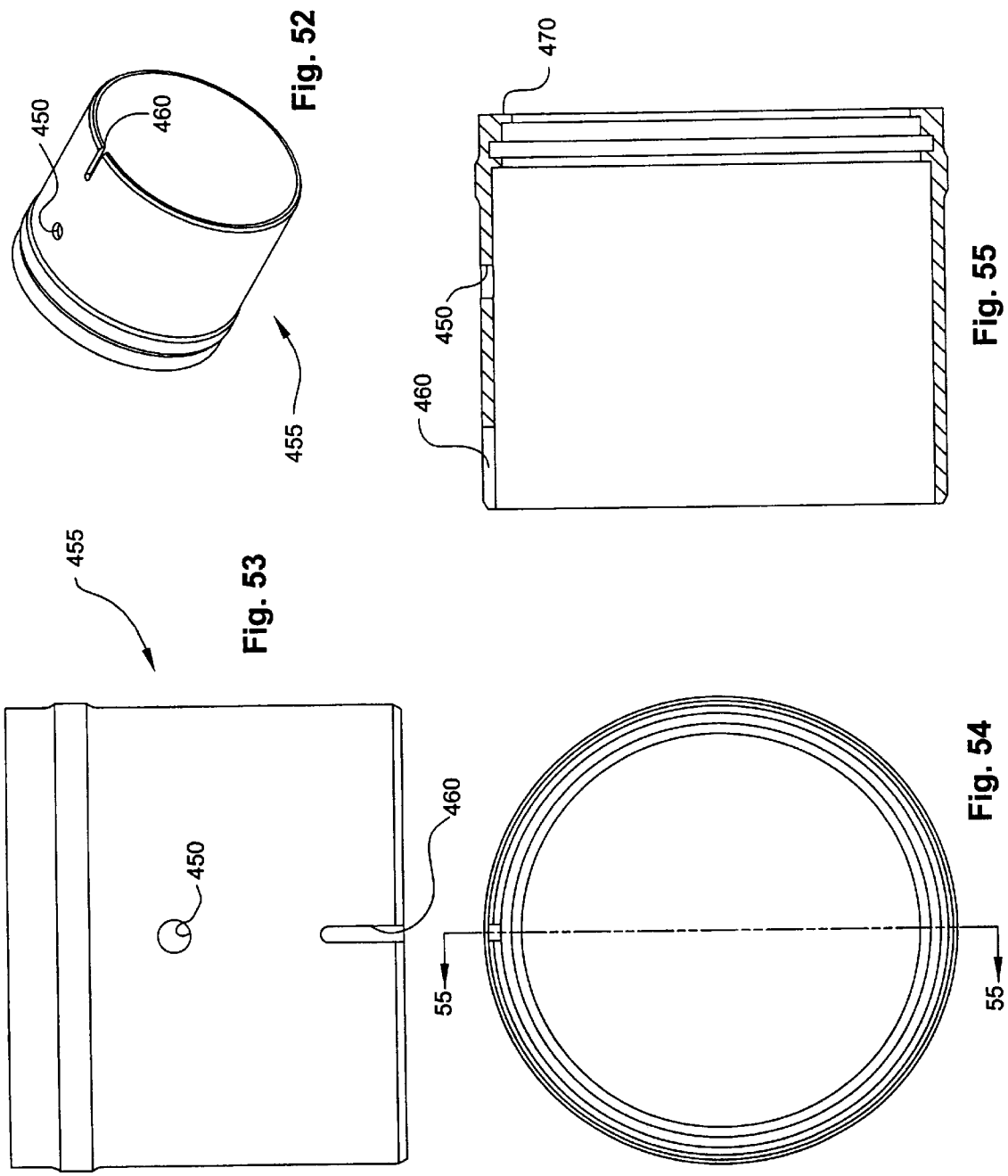

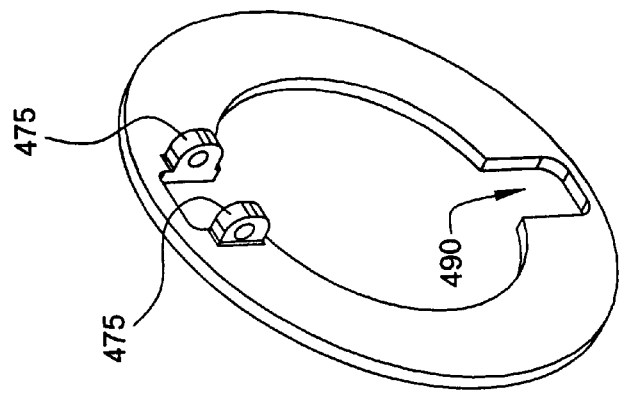
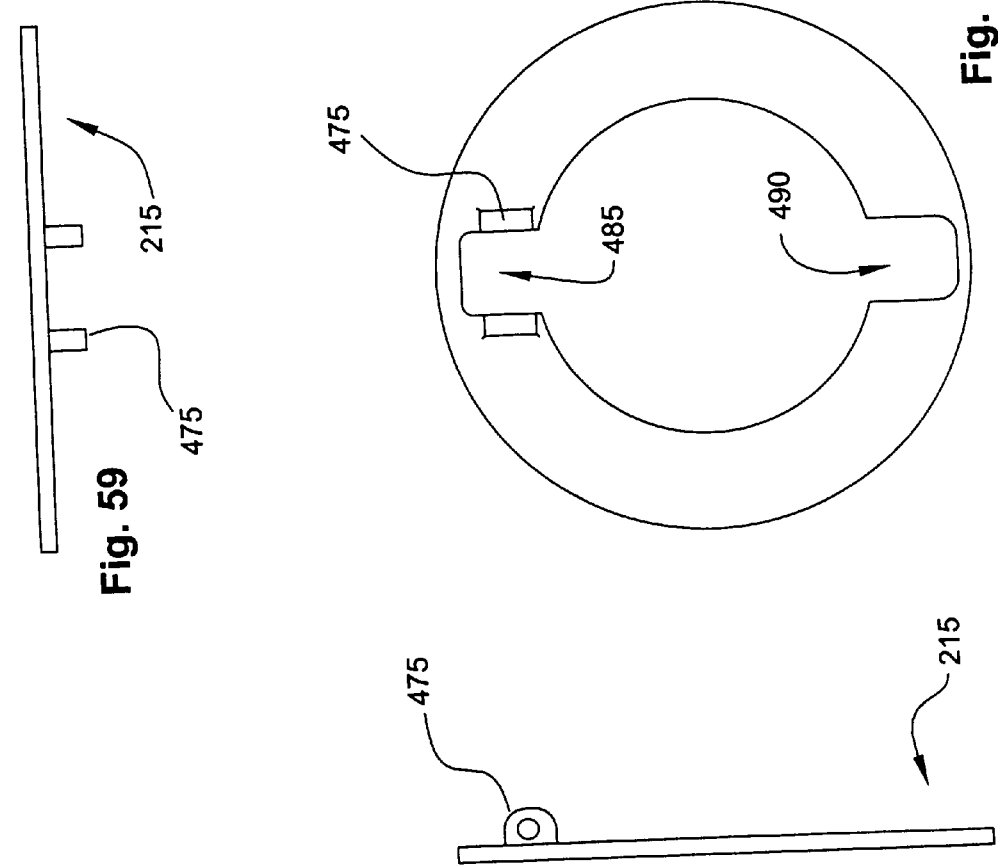
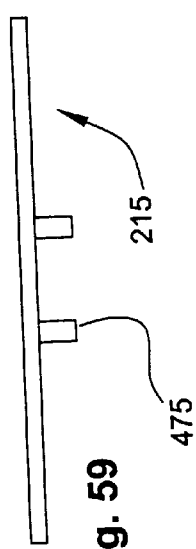

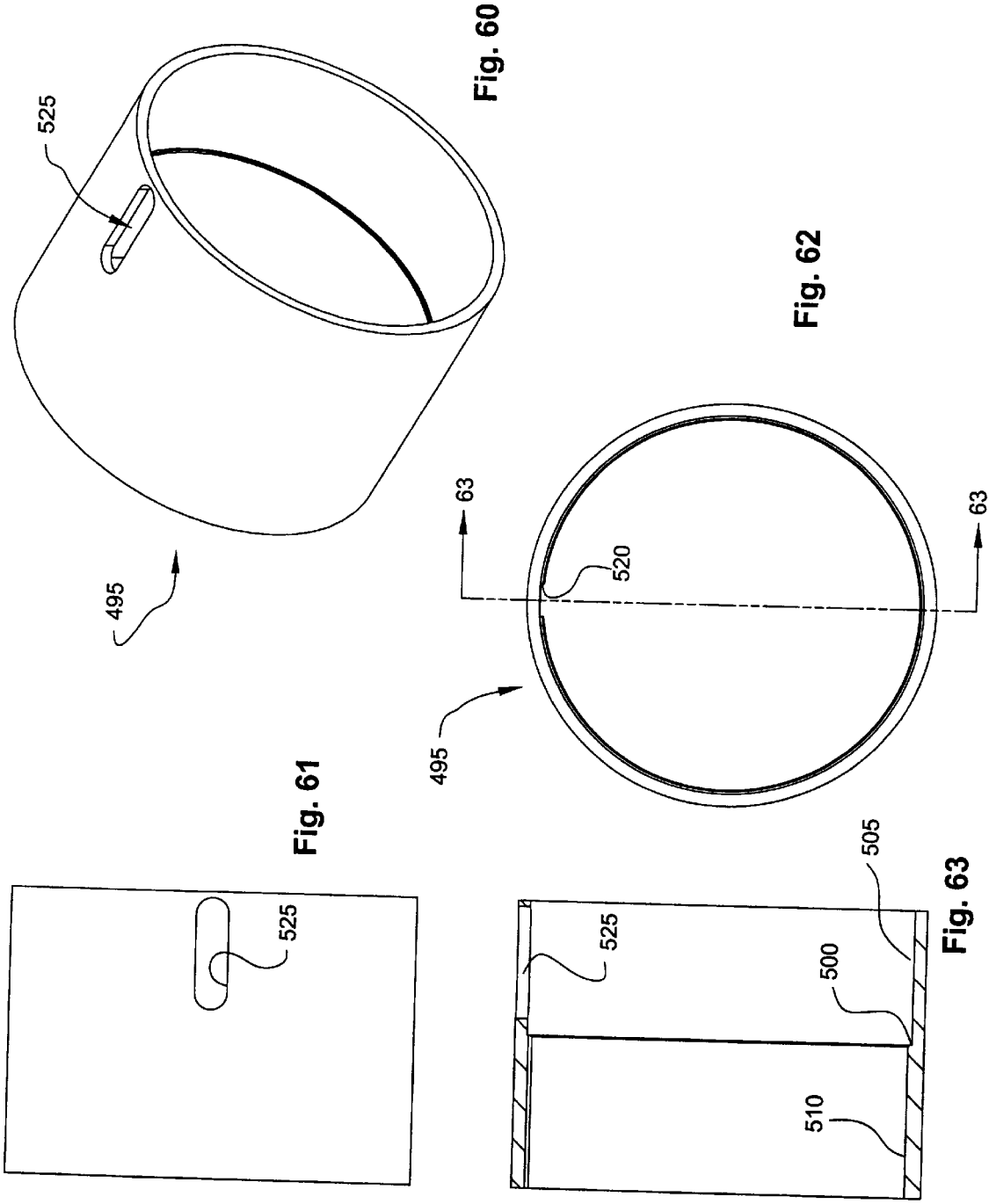

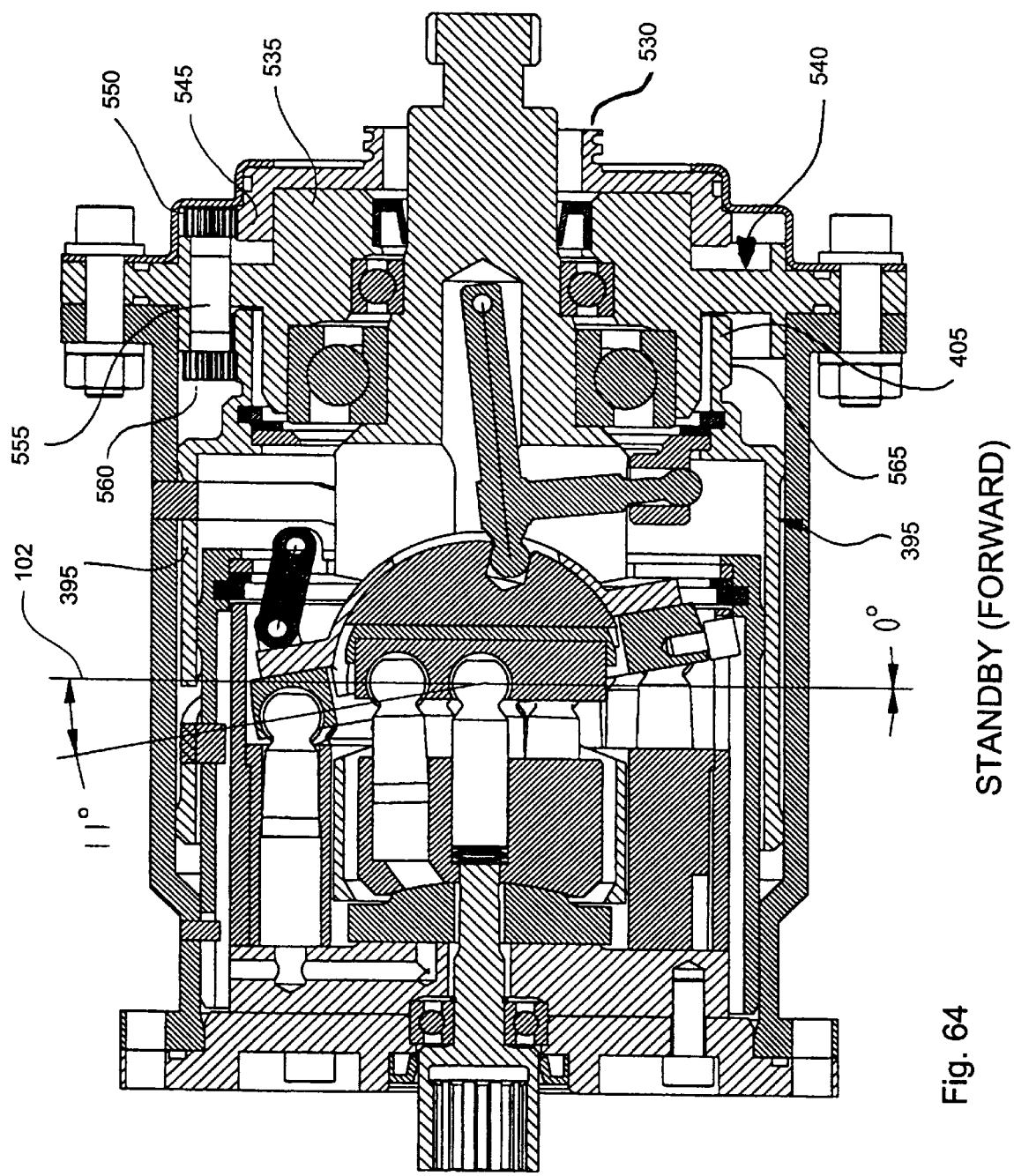

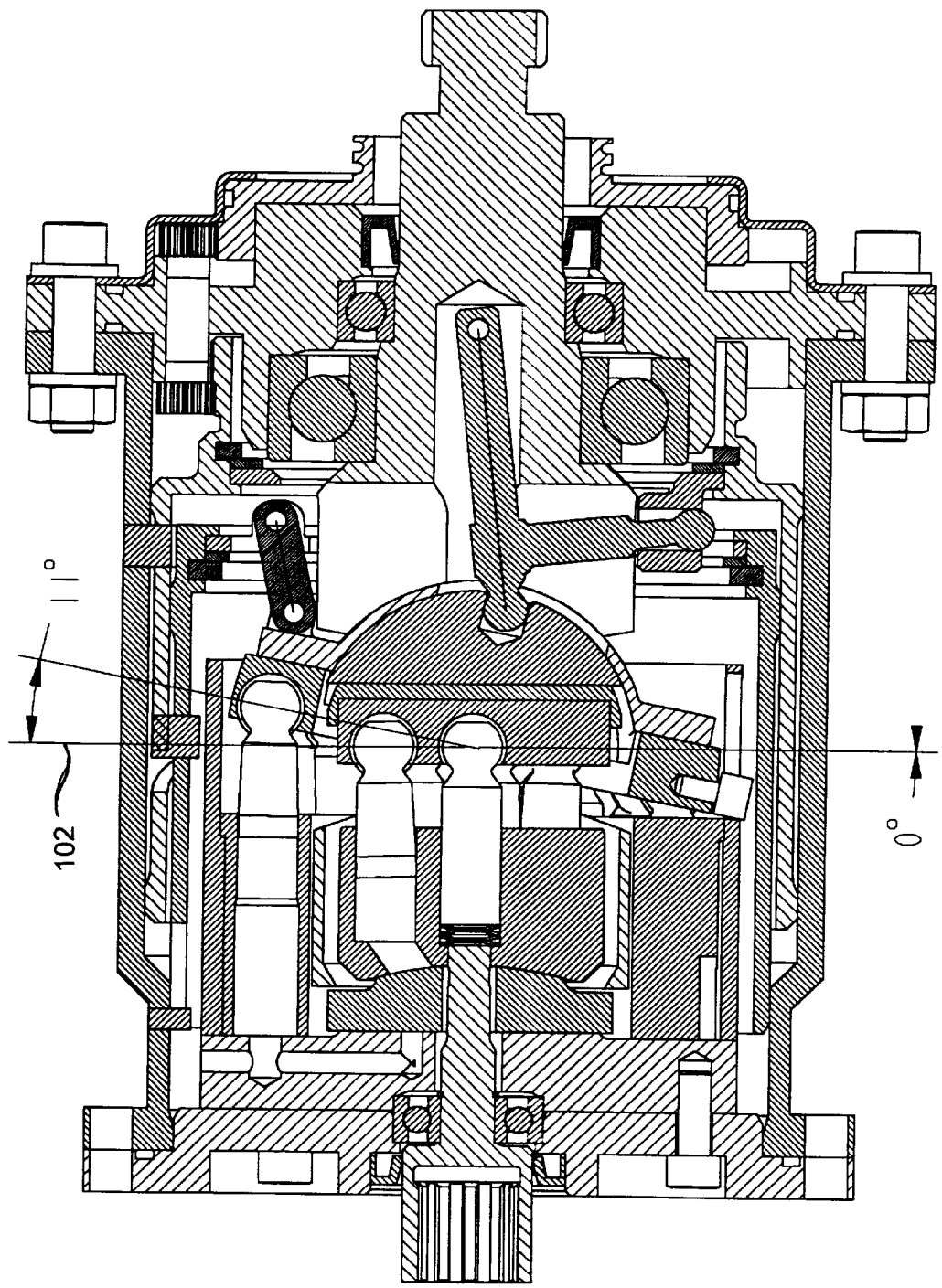
Fig. 65  STANDBY (REVERSE)

CONCENTRIC AXIAL PISTON TRANSMISSION

TECHNICAL FIELD

This application pertains to a continuously variable hydrostatic transmission, and more particularly to a continuously variable hydrostatic transmission having continuously variable concentric axial piston pump and motor units interconnected by fluid and mechanical couplings and arranged in a compact concentric design.

BACKGROUND OF THE INVENTION

Many variable speed drive mechanisms of various designs are described in the literature or are commercially available. These mechanisms find application in fields as diverse as agricultural equipment, garden tractors, machine tools, recreational vehicles, construction equipment, trucks and automobiles. They all share the basic function of converting the rotational speed and torque of an input shaft to a selected variable speed and torque at an output shaft.

Small recreational vehicles and personal transportation vehicles such as motorcycles and motor scooters are ideal applications for an infinitely variable speed drive mechanism because of the improved economy, longer service life and low exhaust emissions that can be obtained by operating the vehicle's prime mover, such as an internal combustion engine, in the range of its optimum operating point and varying the speed of the vehicle by adjusting the transmission over a continuous range instead of changing the vehicle engine speed. Use of an efficient infinitely variable transmission in a large number of vehicles would save an inestimable amount of fuel and reduce the world-wide exhaust emissions more than any other know conservation and air purity stratagem now considered feasible.

Although many infinitely variable transmissions and continuously variable transmissions have been proposed and designed for vehicular applications, none has proven entirely satisfactory. Traction devices have been unable to demonstrate acceptable life and the transient torque conditions occurring in a normal vehicle driving cycle. Rubber belt variator devices, such as the centrifugal clutch commonly used in snowmobiles and motor scoters, do not offer adequate durability and efficiency, even in light vehicles with engine power on the order of only ten to fifteen horsepower. The most common application for this type of transmission is the snowmobile, where component life is not expected to exceed 100 hours.

Hydrostatic transmissions have existed for years and have been developed to a high degree of sophistication. These devices are in use in some military, agriculture and construction equipment, mining and other off-the-road vehicles, and in small garden tractors. A conventional hydrostatic transmission has two principal elements: a hydraulic pump driven by the prime mover, and a hydraulic motor powered by hydraulic fluid pressurized in the pump for driving the load. Either or both of the pump or motor may be variable displacement to achieve the variable gear ratio of the transmission. Regardless of the configuration selected, the overall system efficiency can be no better than the product of the efficiencies of the individual elements. For example, if both the pump and motor are 95% efficient, the hydrostatic unit cannot achieve efficiency greater than (0.95×0.95)=90% and in practice it is usually significantly less than this because of flow losses in the hydraulic lines coupling the two elements. This efficiency is inferior to that offered by conventional automatic transmissions which can operate at steady state efficiency levels on the order of 97%–98% with torque converter lock-up, but the advantages of an infinitely variable transmission and the absence of a clutch outweigh the disadvantage of low efficiency in the applications in which conventional hydrostatic transmissions have been used successfully.

In addition to their low operating efficiencies, there are other disadvantages that have militated against the wide use of conventional hydrostatic transmissions. They are usually bulky, heavy and expensive. In addition, conventional hydrostatic transmissions are noisy, especially at the higher gear ratios where most over-the-road driving is done because the flow rate of the hydraulic fluid is greatest at the high gear ratios in these hydrostatic transmissions.

The integrated hydrostatic transmission, in which the motor and pump are combined in one unit to minimize fluid flow losses, is a step in the right direction. However, none of the prior art integrated hydrostatic transmissions overcome the condition which degrades their efficiency and contributes to their noisiness, namely, that the peak power rating of the transmission is attained at maximum pressure and flow. As a consequence, hydraulic losses associated with pressure, such as leakage and hysterisis losses during fluid compression and expansion will be greatest at maximum power throughput. Also, viscous flow losses which are proportional to fluid velocities are greatest at peak power/speed when the flow and pressure are at their highest levels.

The lack of enduring commercial uses of hydrostatic transmissions in production for vehicle or other uses that require a high power-to-weight ratio is believed to be due to four main reasons: 1) high cost, 2) high noise levels at normal operating conditions, (3) poor efficiency, and (4) lack of any significant weight and size advantage. However, modern production techniques have been developed that would make it possible to produce a hydrostatic transmission designed specifically for such applications at a cost approximately comparable to that of a prior art adjustable ratio variable transmission. The second and third factors, namely, noise and efficiency, have been the key factors discouraging adoption of a hydrostatic transmission by the recreational and personal vehicle industries. The size and weight factors could be significant if there were competing designs that satisfied the first three factors.

One effort to overcome some of the disadvantages of the conventional hydrostatic transmission is the power branching transmission. An early example of such a transmission is shown in U.S. Pat. No. 3,175,363 to Hans Molly. The power branching transmission was intended to reduce the fluid flow losses associated with the hydrostatic transmission, particularly as the transmission ratio moves toward unity, by transmitting a portion of the input power mechanically to the output shaft. Since the proportion of mechanically transmitted power increases to 100% at a 1:1 transmission ratio, the hydraulic losses are potentially much less in a power branching transmission.

Unfortunately, attempts to commercialize the power branching hydrostatic transmission have been unsuccessful, probably because the complexity of the system would compromise performance and increase cost to a noncompetitive level versus the conventional transmission. Also, the prior art power branching transmissions have not been able to achieve a dynamic balance of the rotating elements which would be a serious shortcoming since substantial vibration levels at operating speed would not be acceptable. In addition, prior art power branching transmissions have not been readily scaleable to make different sizes of a single design usable for different power ranges. Scalability could be an important feature in smaller applications such as snowmobiles and motorcycles where the ability to match the size, weight and cost of the transmission precisely with the power, torque and speed requirements could become competitively important.

If the power available in operation of a vehicle during braking and periods of low power requirements could be stored and made available for use during periods of auxiliary or high power requirements such as hydraulic power take-off, engine starting, and vehicle acceleration, the engine sizing for any given vehicle could be reduced substantially, since engines are normally sized for the maximum anticipated power requirements. The storage of hydraulic energy in an accumulator is a well known and understood technology and should encounter no resistance to use in motor vehicle applications as some new technologies have in the past, and the use of a moderately sized accumulator will add little weight and cost, certainly less than is saved by the use of a small light weight compact vane-type continuously variable transmission that makes possible the elimination of a clutch and a starter motor and makes possible the substantial downsizing of the engine because of the availability of the added hydraulic power source.

Thus, the transmission art has long needed an improved infinitely variable hydrostatic transmission that provides the advantages of the integrated hydrostatic transmission while markedly improving efficiency by reducing the hydraulic fluid losses associated with conventional hydrostatic transmissions, reducing the size, weight, cost, emissions and noise levels of operation, improving the performance near the neutral point, offering scalability of some basic machine designs, and reducing the manufacturing and maintenance costs.

SUMMARY OF THE INVENTION

Accordingly, it is an object of this invention to provide a compact hydrostatic transmission having a pump with a set of axial pistons and a motor with a set of axial pistons arranged concentrically with respect to the axial pistons of the pump. It is another object of this invention to provide an improved dynamically balanced power branching transmission in which fluid losses are reduced to near zero at maximum power throughput for steady state operating conditions, resulting in overall operation efficiencies comparable or superior to conventional automatic transmissions, but which enables the engine to maintain an operating level at or near its optimum operating point. Another object of this invention is to provide an improved hydrostatic transmission that is small, light weight, quiet, durable, inexpensive to produce and service, and offers system efficiency in a motor vehicle that is comparable or superior to conventional automatic transmissions. Yet another object of this invention is to provide an improved method of converting power in a rotating input shaft at one speed and torque to nearly the same power in an output shaft at a different speed and torque.

These and other objects of the invention are attained in a power branching transmission which has fluid openings for flow of fluid from radially juxtaposed, concentric axial piston pump and motor units, and an adjustable swash plate axially disposed adjacent the pump and motor units and in operative contact with the axial pistons thereof. The swash plate is coupled to and drives an output shaft. The swash plate is driven by the pump pistons and also by the motor pistons that are pressurized by fluid pressure generated in the pump to provide an infinitely variable transmission ratio for the unit in an efficient and simple manner. Fluid taps in the housing can be provided for coupling to a regenerative braking and accelerating unit, which could also provide engine starting using energy stored from the transmission.

DESCRIPTION OF THE DRAWINGS

The invention, and its many attendant objects and advantages, will become better understood upon reading the following description of the preferred embodiment in conjunction with the following drawings, wherein:

FIG. 8 is a perspective view of the outside of the transmission shown in FIG. 1;

FIGS. 14–18 are views of the inner swash plate in the transmission shown in FIGS. 2 and 3;

FIGS. 19–22 are various views of the base port plate of the transmission shown in FIGS. 2 and 3;

FIGS. 26 and 27 are perspective assembled and exploded views, respectively, of the output assembly of the transmission shown in FIGS. 2 and 3;

FIGS. 28–32 are views of the output swash plate in the transmission shown in FIGS. 2 and 3;

FIGS. 33–36 are views of the control key engaged in the output swash plate of the transmission shown in FIGS. 2 and 3;

FIGS. 49–51 are views of the control tube in the transmission shown in FIGS. 2 and 3;

FIGS. 52–55 are views of the control sleeve in the transmission shown in FIGS. 2 and 3;

FIGS. 56–59 are various views of the output control plate in the transmission shown in FIGS. 2 and 3;

FIGS. 60–63 are views of the torque tube in the transmission shown in FIGS. 2 and 3;

FIG. 64 is a sectional elevation of a slightly modified version of the transmission shown in FIGS. 2 and 3, showing the controls set to a forward standby position;

FIG. 65 is a sectional elevation of the modified version of the transmission shown in FIG. 64, showing the controls set to a reverse standby position.

DESCRIPTION OF THE PREFERRED EMBODIMENT

Figure 1:
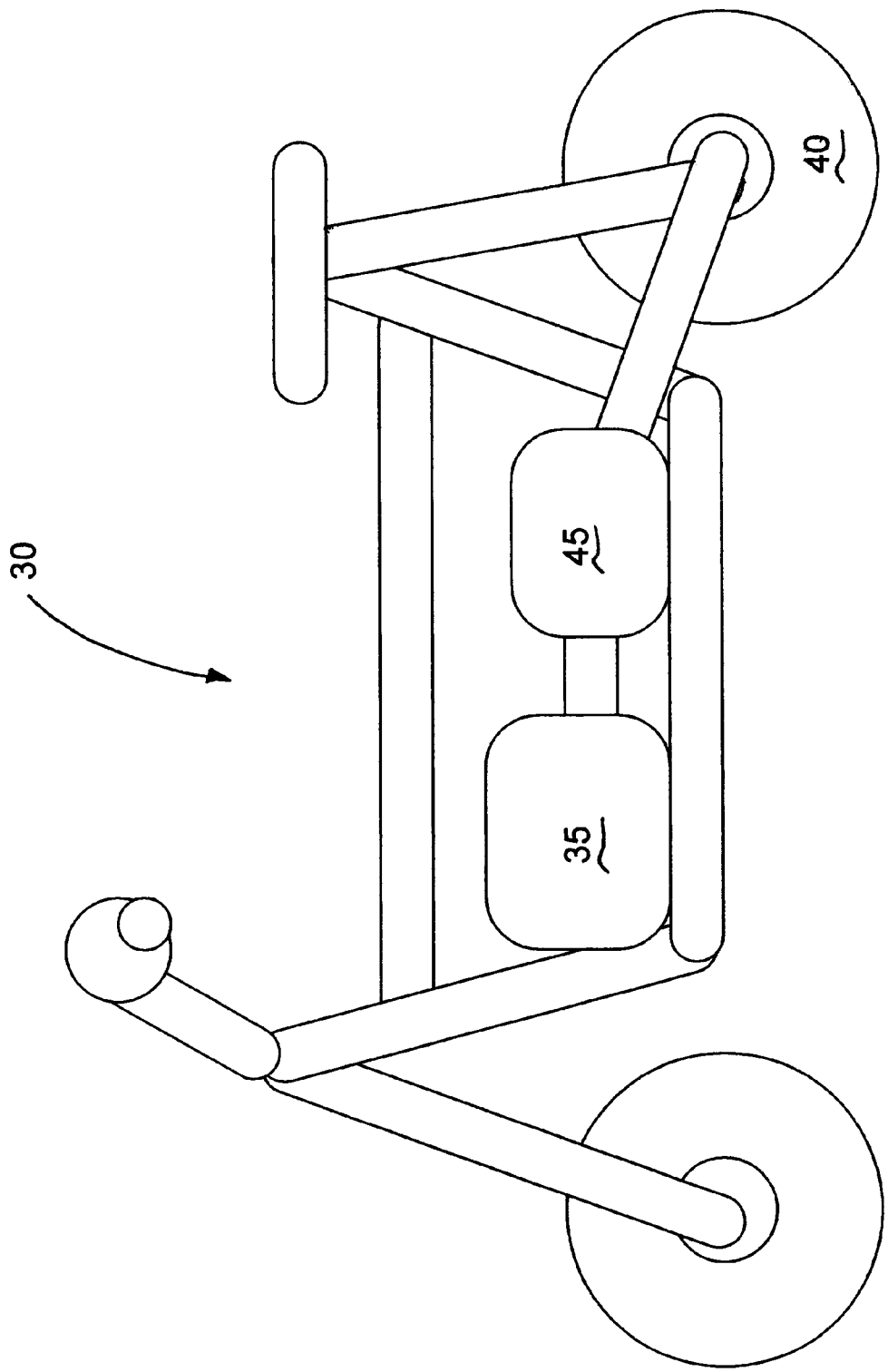
FIG. 1 is a schematic representation of a small motorcycle or motor scooter having a hydrostatic transmission in accordance with this invention between the engine and the drive shaft.

A vehicle such as a small motor cycle or motor scooter 30 shown in FIG. 1, has a driver or prime mover such as a motor or engine 35 and driven devices such as wheels 40 or tracks. Input power in the form of rotary speed and torque from the motor 35 is delivered to a continuously variable hydrostatic transmission 45 bolted to the engine. The transmission 45 converts the input power to output power to the driven devices at a continuously adjustable speed and torque with a transmission ratio between 1:0 and 1:1. The continuously variable hydrostatic transmission 45, shown in FIGS. 2 and 3, has an axial input shaft 50 and an axial output shaft 55 journaled for rotation in a housing 46. For convenience, the input side will sometimes be referred herein as the "back side" and the output side will be referred to as the "front side" although those terms have no absolute meaning and are used merely for ease of reference. The input shaft 50, shown separately in FIGS. 4–7, has a torque coupling in the form of a splined receptacle 60 on its outside end, projecting beyond the housing 46, as shown in FIG. 8, for coupling to the driver. The output shaft 55, shown in FIGS. 9–13, has a torque coupling in the form of a splined knob 65 on the outside end projecting beyond the housing 46 for torque coupling to a driven device such as the drive shaft of the vehicle 30 shown in FIG. 1.

Figure 2:
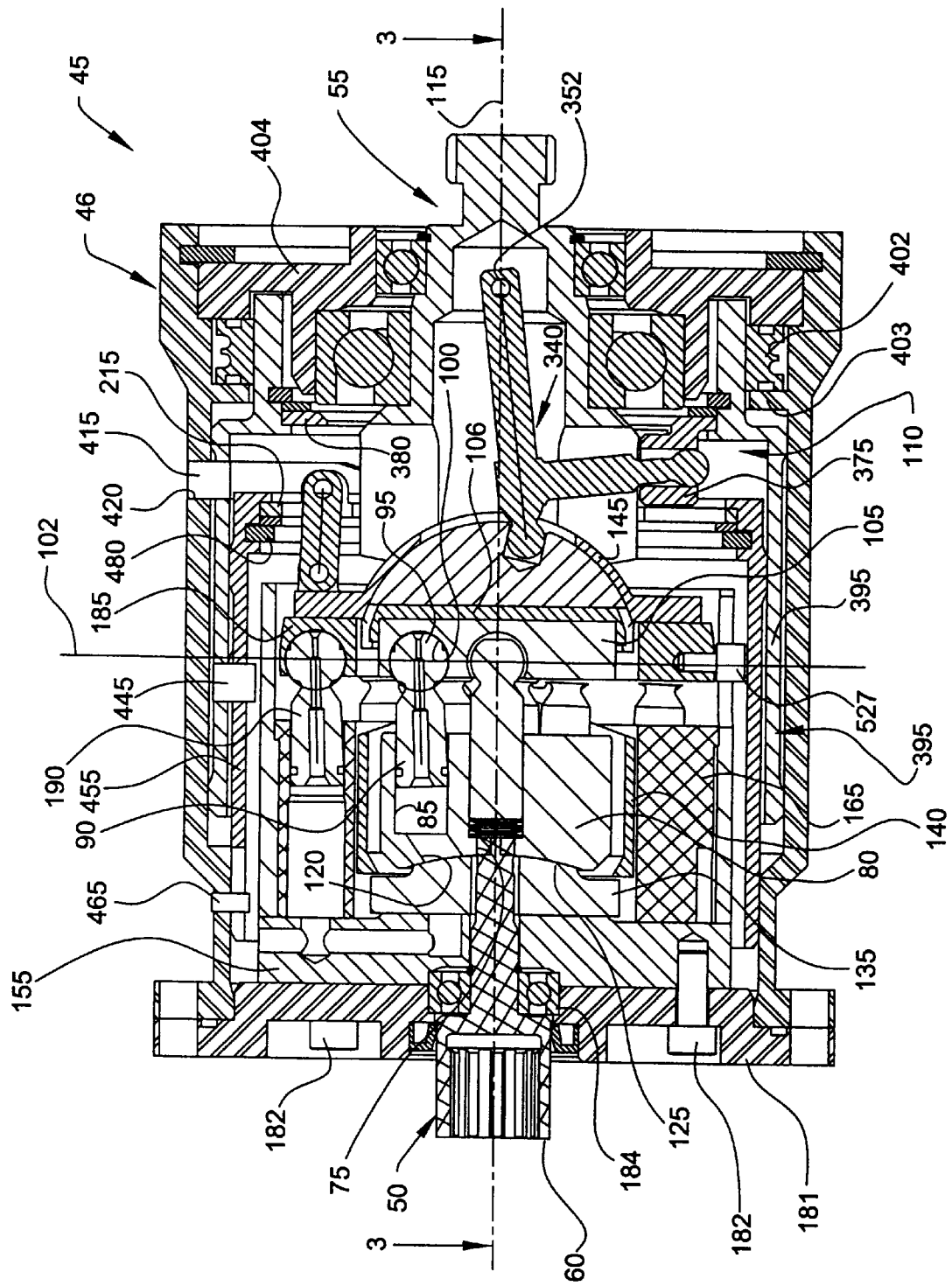
FIGS. 2 and 3 are cross sectional elevations of the transmission shown in FIG. 1.
Figure 3:
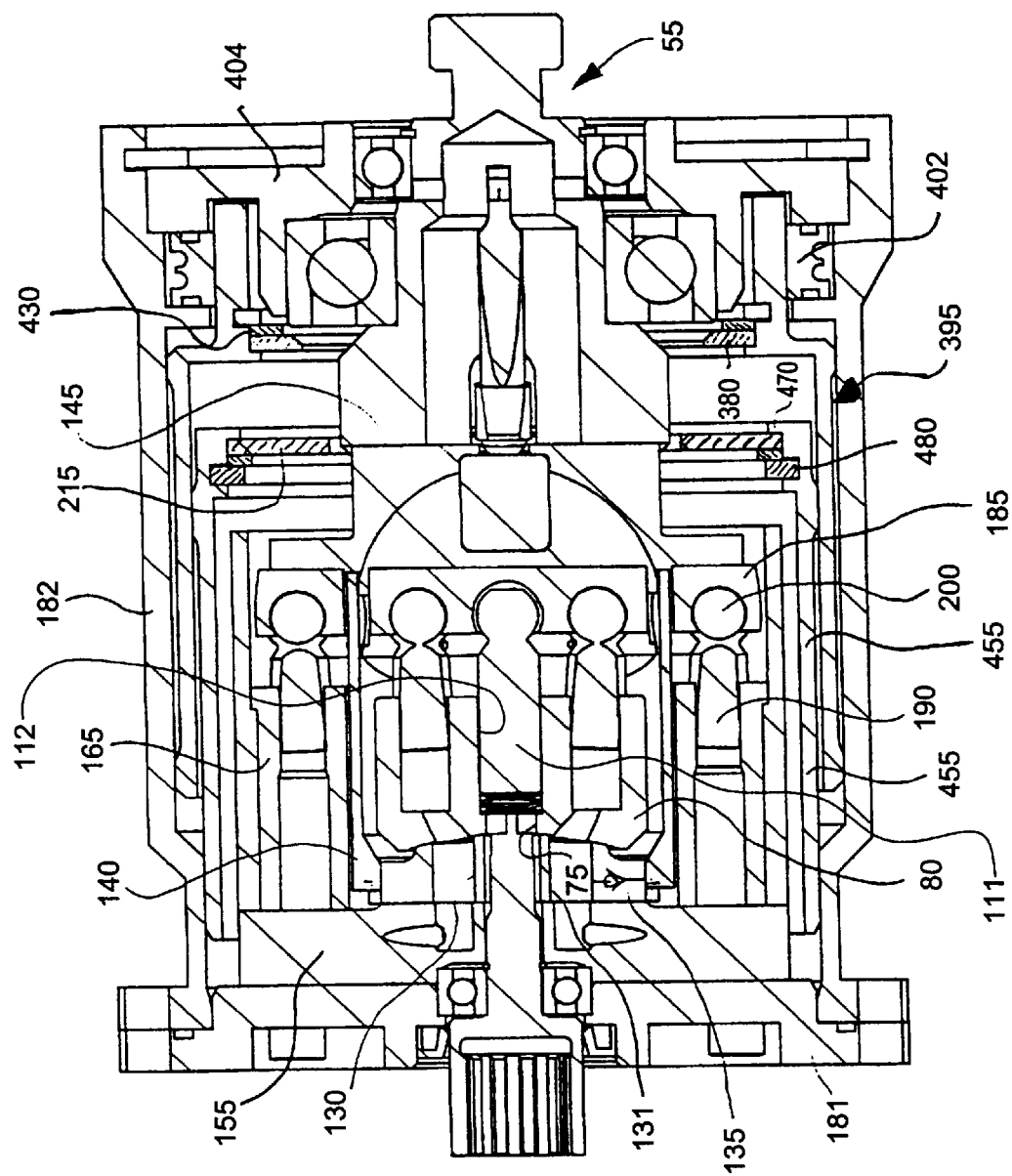
Figure 4:
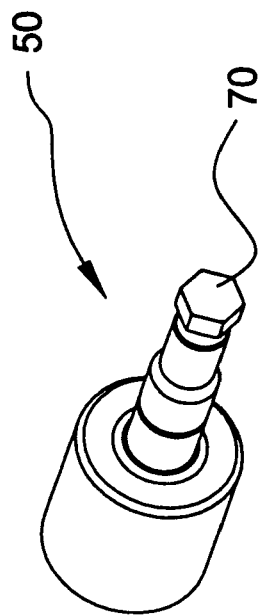
FIGS. 4–7 are views of the input shaft shown in FIGS. 2 and 3.
Figure 7:
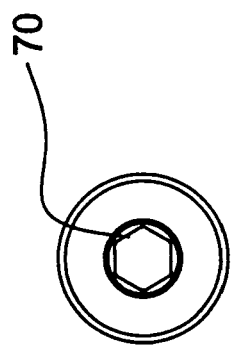
Figure 6:
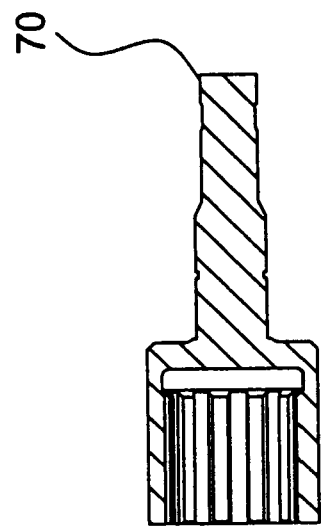
Figure 5:
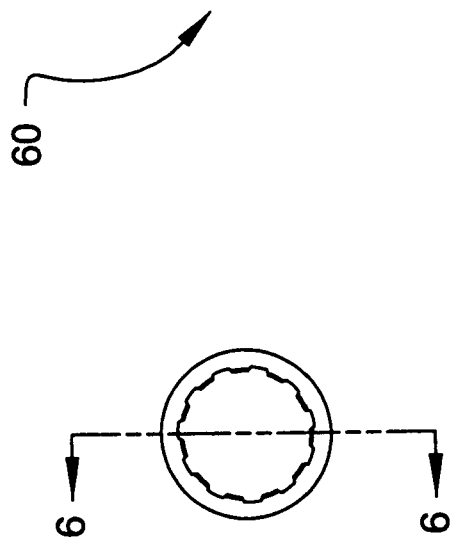
Figure 9:
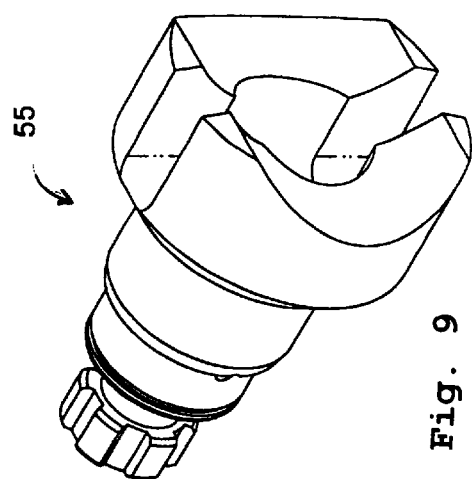
FIGS. 9–13 are views of the output shaft in the transmission shown in FIGS. 2 and 3.

The inner end of the input shaft has a hexagonal knob 70, shown in FIG. 4, which fits into an axial hexagonal recess 75 in a pump cylinder block 80, shown in FIGS. 2 and 3. Seven axial cylinders 85 bored in an equally spaced circular array around the cylinder block 80 each have an axial piston 90 with a ball shaped piston head 95 which fits into a spherical socket 100 in a pump wobble plate 105. As shown in FIGS. 2 and 3, the centers of the piston heads 95 all lie in a transverse plane 102 perpendicular to the central machine axis 115 when the pump wobble plate 105 is in its home or perpendicular position illustrated in FIGS. 2 and 3. The pump wobble plate 105 lies in a shallow cylindrical recess of an inner swash plate 106 shown in detail in FIGS. 14–18 and described below. The angle of the inner swash plate 106 controls the angle of the pump wobble plate 105 and can be controlled within a wide angular range by an inner swash plate angle control mechanism 110 described below. A lesser angular range of about 0°–11° for swash wobble adjustment is sufficient for this application.

A center piston 111 in a center cylinder 112 in the pump cylinder block 80 and has a piston head engaged in a center spherical socket 113. A stack of Belleville springs 113 at the bottom of the center cylinder 112 biases the center piston 11 out against the pump wobble plate 105 and biases the pump cylinder block 80 into contact with a pump port plate 135 to maintain sealing pressure between the pump cylinder block 80 and the port pump plate 135 during start-up before system pressure has been established.

Figure 66:
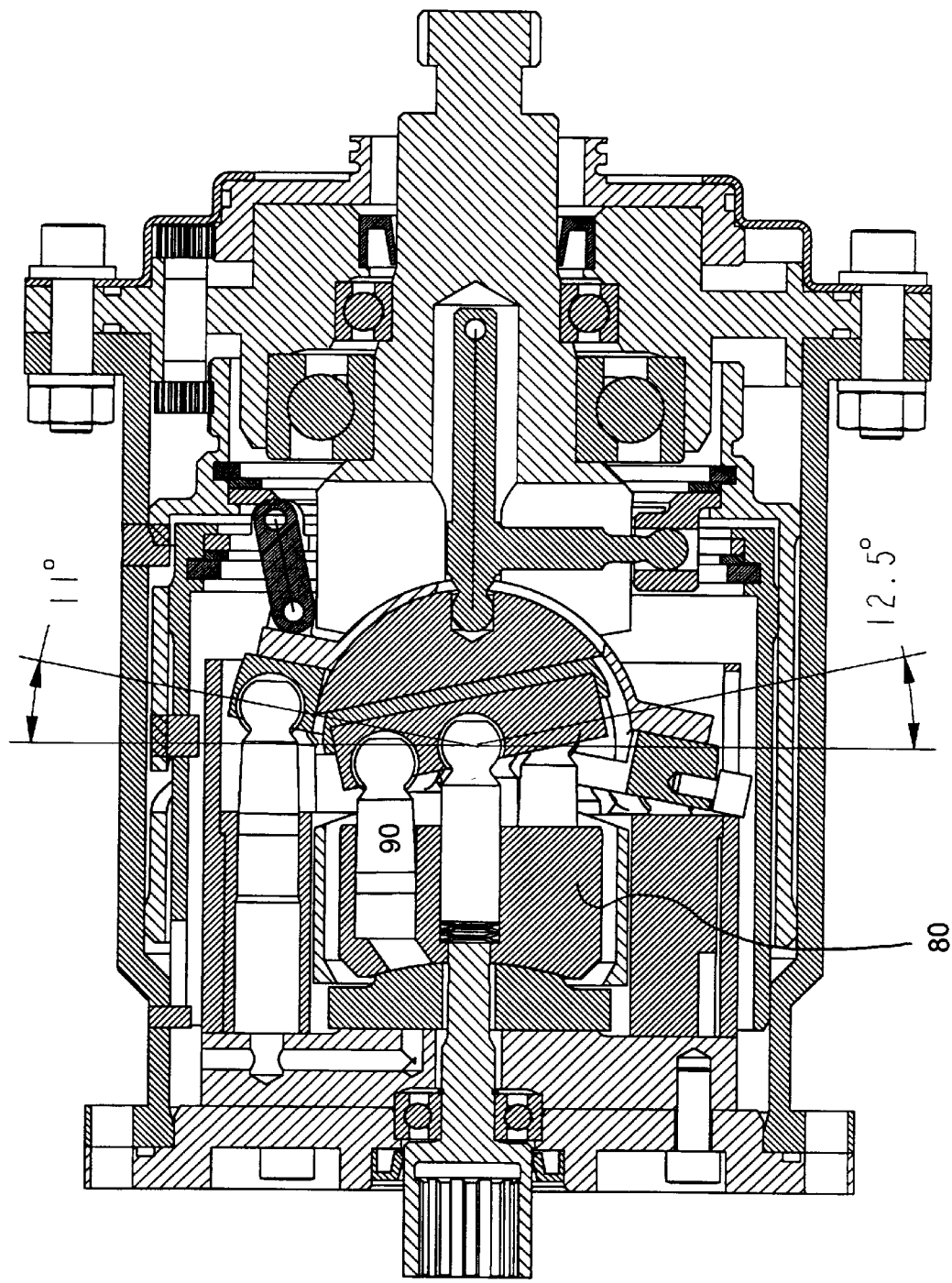
FIG. 66 is a sectional elevation of the modified version of the transmission shown in FIG. 64, showing the controls set to a reverse position.

Rotation of the pump cylinder block 80 by the input shaft 50 rotates the pump pistons 90 and the pump wobble plate 105 about the central axis 115 of the machine. In FIGS. 2 and 3, the swash plate 106 lies in a home position normal to the central axis 115, which is defined herein as a 0° position, resulting in no axial motion of the pistons 90. Rotation of the pump cylinder block 80 when the swash plate 106 is adjusted to a position other than the 0° position shown in FIGS. 2 and 3, as illustrated in FIG. 66, causes the wobble plate 105 to nutate and drive the pistons 90 axially in the cylinders 85 one stroke cycle per revolution of the pump cylinder block 80, with a stroke that is proportional to the degree that the swash plate 105 is tilted away from the 0° position.

Reciprocation of the pump pistons 90 displaces fluid in the pump cylinders 85 through individual angled ports 120 opening in the back face 125 of the pump cylinder block 80.

Pressurized fluid from the pump cylinders 85 is conveyed from the angled ports 120 into one of two kidney-shaped slots 130 and 131 through the pump port plate 135, as shown in FIG. 3. The two slots 130 and 131 are arranged diametrically opposed and symmetrical about a central axial plane containing the central axis 115 and perpendicular to the plane of FIG. 2, as indicated at 3—3 in FIG. 2 and on which the section of FIG. 3 is viewed. This central axial plane, which rotates with the output shaft 55, divides a pressure side of the pump from a suction side. That is, on the pressure side, the pistons are all moving to the left in FIGS. 2 and 3 to pressurize and displace fluid out of the pump cylinders 85, whereas on the suction side of the central plane, the pistons 90 are all moving to the right to draw fluid into the pump cylinders. Thus, one of the kidney shaped slots 130 in the pump port plate 135 is always in communication with all of the pump cylinders 85 in the pump cylinder block 80 in which the pistons 90 are pressurizing and displacing fluid, and the other kidney shaped slot 131 is always in communication with all of the pump cylinders 85 in the pump cylinder block 80 in which the pistons 90 are sucking fluid into the cylinders 85 The pump port plate 135 remains synchronized with the rotation of the central plane by a synchronizing sleeve 140 coupled between an output swash plate 145 and the pump port plate 135, as described below.

Figure 23:
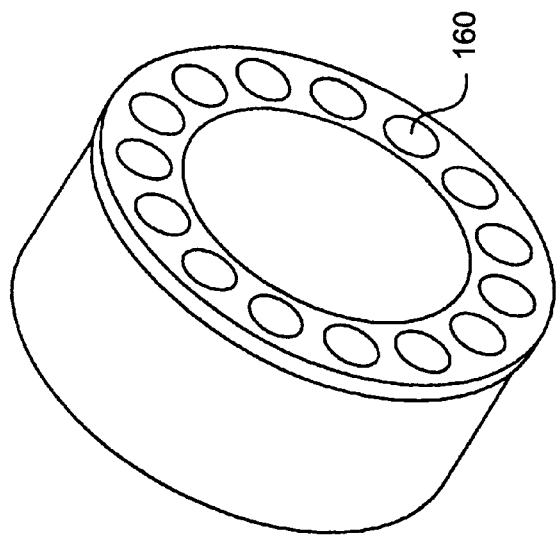
FIGS. 23–25 are various views of the motor cylinder block of the transmission shown in FIGS. 2 and 3.
Figure 25:
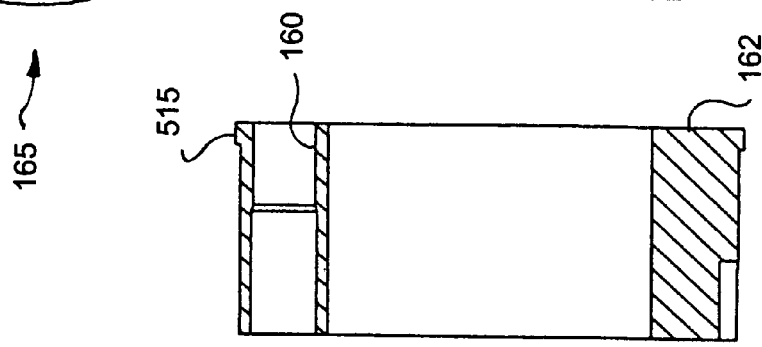
Figure 24:
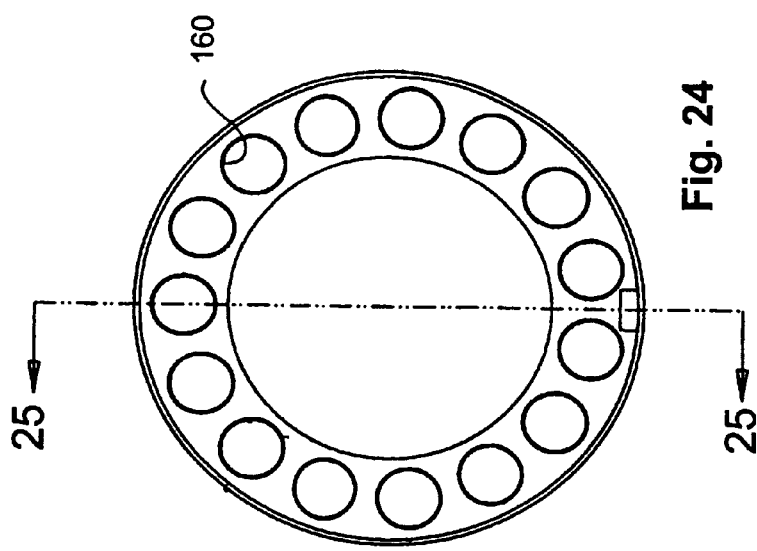
Figure 37:
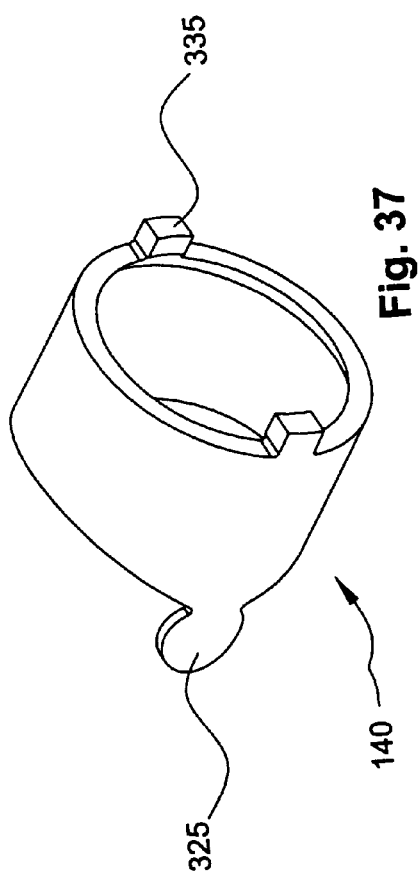
FIGS. 37–40 are views of the rotator sleeve in the transmission shown in FIGS. 2 and 3.
Figure 40:
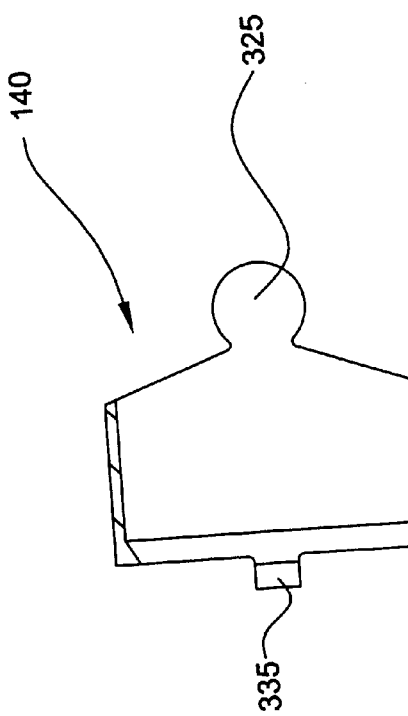
Figure 38:
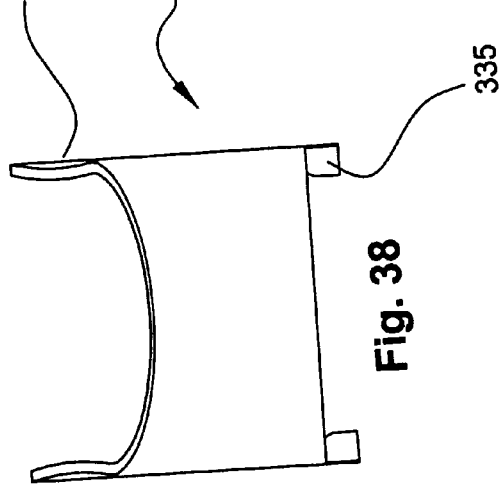
Figure 39:
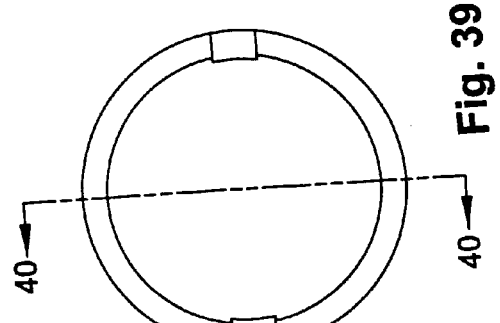
Figure 41:
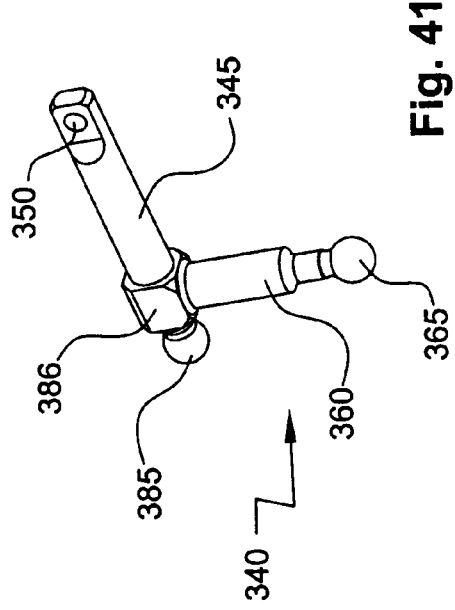
FIGS. 41–44 are views of the input control bell crank in the transmission shown in FIGS. 2 and 3.
Figure 43:
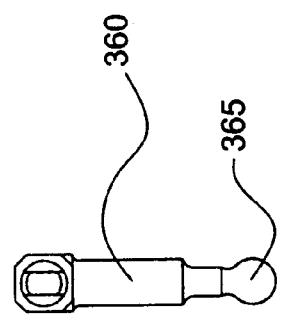
Figure 44:
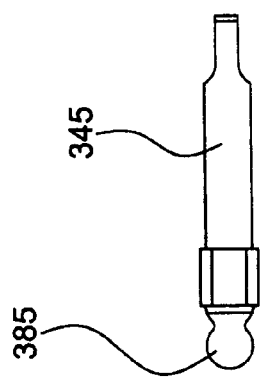
Figure 42:
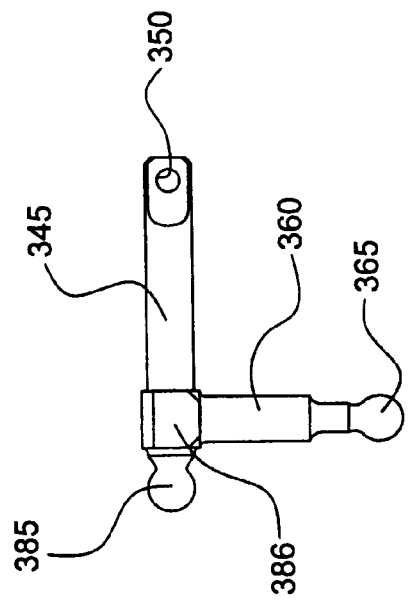
Figure 45:
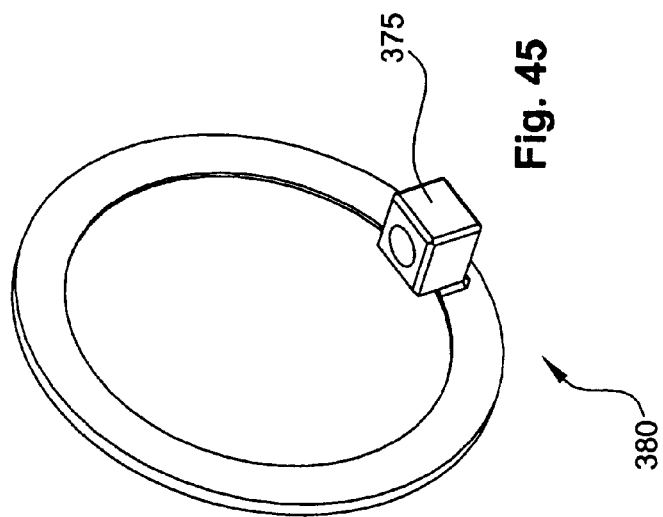
FIGS. 45–48 are views of the input control ring in the transmission shown in FIGS. 2 and 3.
Figure 47:
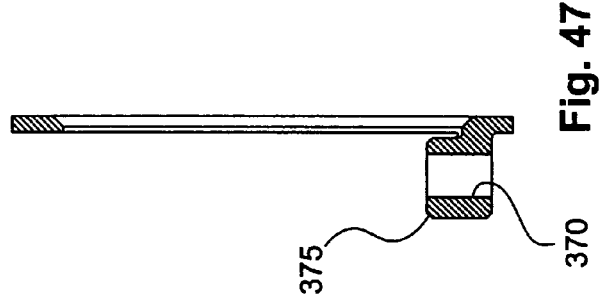

Fluid under pressure from the pressurizing cylinders 85 passes through the kidney-shaped slot 130 and into blind tear-drop shaped slots 150 opening in the front face 152 in a base port plate 155, shown in detail in FIGS. 19–22. There are as many openings 155 as there are cylinders 160 in a motor cylinder block 165 shown in FIGS. 2 and 3, and shown in detail in FIGS. 23–25 as an annular cylinder having a thick annular wall 162 in which the cylinders 160 are bored through, communicating with both axial ends of the motor cylinder block 165. A radial hole 170 extends from the outside radial periphery of the base port plate 155 to each opening 155, and another hole 175 is drilled parallel to the central axis 115 from the front face 152 of the base port plate 155 to intersect each radial hole 170. The outside radial opening of the holes 170 are all plugged at 176 to prevent loss of pressurized fluid out through the outer ends of the holes 170. The openings 150 and holes 170 and 175 provide a fluid passage from the kidney shaped slots 130 and 131 in the pump port plate 135 to the motor cylinders 160 in the motor cylinder block 165. In this way, fluid under pressure is manifolded in the kidney-shaped slot 130 and distributed through the fluid passage 155-170-175 to the motor cylinders 160 to be pressurized, and fluid displaced from the cylinders 160 for recharging the pump cylinders is manifolded in the kidney-shaped slot 131 and drawn into the suction-side pump cylinders 85. Whatever leakage occurs on the pressure side fluid path is made up from hydraulic fluid with which the housing is completely filled through a check valve 180 in a radial passage communicating between the suction kidney-shaped slot 131 and the outside periphery of the pump port plate 135.

A rear end cap 181 is bolted to the rear end of the cylindrical body of the housing 46. Holes in the end cap 181 receive machine screws 182 which are threaded into blind holes 183 in the base port plate 155, as shown in FIGS. 21 and 22 to hold it in place against the inside of the end cap 181. The base port plate 155 is centrally apertured to receive the input shaft and a central recess is machined into the back side in alignment with a similar recess in the rear end cap 181 to receive a bearing 184 by which the input shaft is journaled in the housing 46 and the base port plate 155.

An annular motor wobble plate 185, shown in FIGS. 2 and 3, and also in FIGS. 26 and 27, engages the ends of motor pistons 190 disposed for axial reciprocation in the motor cylinders 160. In the preferred embodiment, a series of spherical pockets 195 are machined on equally spaced centers in a ring around the rear face of the wobble plate 185, and the motor pistons 190 have spherical heads 200 that fit into the spherical pockets 195. The motor wobble plate 185, shown in FIGS. 26 and 27, has seven spherical pockets to receive seven piston heads in a seven-cylinder motor cylinder block instead of the fifteen cylinders in the motor cylinder block 165 shown in FIGS. 23–25 to illustrate the design flexibility provided by this concentric axial piston transmission. The larger number of cylinders in the motor cylinder block results in a lower system pressure but has higher parts count and cost.

Pressurizing the motor cylinders 160 in the motor cylinder block 165 with hydraulic fluid displaced from the pump cylinders 85 extends the motor pistons 190 axially against the wobble plate 185, causing it to nutate about the central axis 115. The nutating wobble plate 185 bears against an axially facing surface 203 of a radial flange 205 on the output swash plate 145, shown in detail in FIGS. 28–32. The output swash plate 145 is linked to a output control plate 215 by a link 220 attached to the output swash plate 145 by a pin which extends through the link and through aligned holes 221 in two lugs 222 on the front face of the flange 205. A central boss 225 projects forward from the front face of the output swash plate 145 within the flange 205. The front end of the boss 225 has a convex cylindrical front surface 230 which is forcibly engaged with a mating concave cylindrical surface 235 on the rear end of the output shaft 55 by virtue of the axial forces exerted by the pistons 90 and 190 indirectly against the output swash plate. The convex cylindrical front surface 230 of the output swash plate 145 has an axis 240 that is parallel to the axis through the aligned holes 221 in the lugs 222 so that tilting motion of the output swash plate 145 by the control link 220 does not change the alignment of the cylindrical surface 230 of the boss 225 in the cylindrical recess 235 in the rear end of the output shaft 55. Rotation of the output swashplate 145 drives the output shaft 55 through the engagement of the concave cylindrical surface 230 with the convex cylindrical surface 235 on the rear end of the output shaft, while permitting tilting motion of the output swash plate 145 about the axis 240 of the cylindrical surfaces 230 and 235 as produced by linear control motion of the output control plate 215 and the control link 220. The axis 240 lies in the transverse plane 102 and intersects the central axis 115 of the machine.

The rear face of the output swash plate 145 has a central spherical recess 245 in the center of which lies a cylindrical recess 250 having a central transverse axis coincident with the axis 240 of the cylindrical surface 230 of the output swash plate 145. The central spherical recess 245 has a center of curvature 255 lying at the intersection of the central axis 115 of the machine and the axis 240 of the cylindrical surface 230.

The inner swash plate 106 shown in FIGS. 14–18 has a spherical front face 265 with a radius of curvature equal to the radius of curvature of the spherical rear surface of the output swash plate 145, and has a rear face in the form of a shallow cup having a flat rear face 270 and a low circular peripheral edge wall 275. A transverse slot 280 opening axially in the spherical front face 265 receives a control key 285, shown in detail in FIGS. 33–36, having a forward facing cylindrical surface 290 in which a blind control hole 295 is drilled, and a flat rear surface 300 which lies flat against the bottom 305 of the transverse slot 280 in the inner swash plate 106. The key 285, when fully seated in the slot 280, projects forward therefrom into the cylindrical recess 250 which establishes a torque coupling between the inner swash plate 106 and the output swash plate 145 while permitting angular adjustment therebetween about the axis 240.

An annular ring 310, integral with the output swash plate 145, surrounds the central spherical recess 245 and projects axially to the rear. A pair of prongs 315 projects axially from both lateral sides of the annular ring, as shown in FIGS. 27, 28 and 31, defining and partially surrounding a pair of cylindrical sockets 320 centered and aligned on the axis 240. The sockets 320 receive a pair of axially projecting ears 325 on the front end of the synchronizing sleeve 140, shown in FIGS. 2 and 3 and shown in detail in FIGS. 37–40, which concentrically surrounds the pump cylinder block 80 and has a pair of tabs 335 which engage the pump port plate 135 in a pair of notches machined in the peripheral edge of the pump port plate 135. The synchronizing sleeve 140 is rotated by engagement of its ears 325 in the cylindrical sockets 320 in the output swash plate 145 at the speed of the output shaft 55 and rotates the pump port plate 135 at that same speed to synchronize the porting of the fluid pressurized by the pressure side of the pump through the high pressure kidney-shaped slot 130 in the pump port plate 135.

Figure 11:
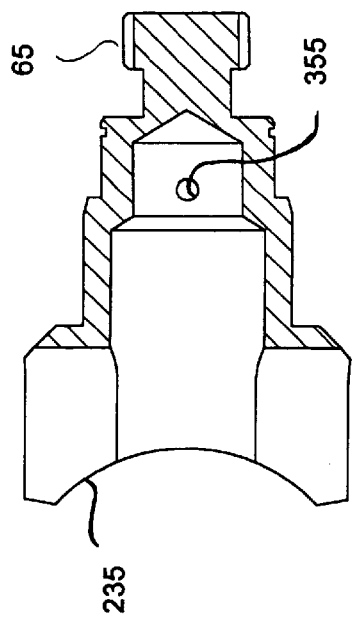
Figure 10:
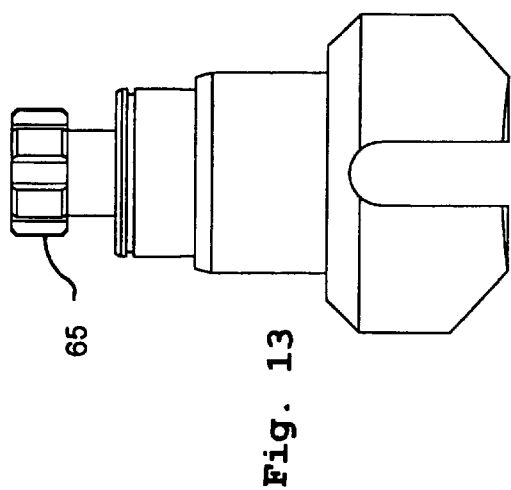
Figure 13:
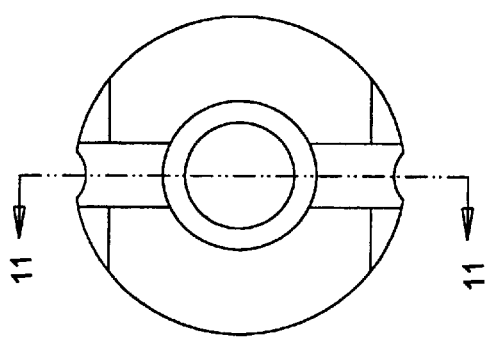
Figure 12:
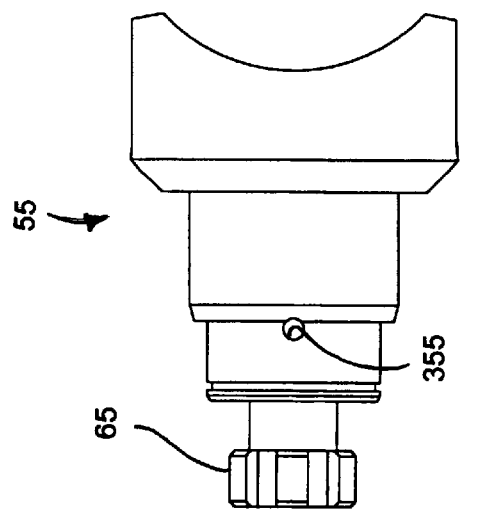

The inner swash plate angle control mechanism 110 includes an input control bell crank 340, shown in FIG. 2 and shown in detail in FIGS. 41–44, having an axial arm 345 ground flat at its front end and having a lateral hole 350 drilled therethrough for receiving a pivot pin 352 by which the bell crank 340 is pivotally connected to the output shaft 55. The axial arm 345 extends into an axial bore 354 in the output shaft 55 and is pinned at its front end by the pivot pin 352 pressed in a lateral hole 355 drilled through the output shaft 55, as best shown in FIGS. 11 and 12. The bell crank 340 includes a lateral arm 360 extending normal to the axial arm 345 and having a spherical ball end 365 engaged in an opening 370 of a socket 375 on an input control ring 380, shown in FIG. 2 and shown in detail in FIGS. 27 and 45–48 for controlling the tilt angle of the bell crank 340 about the pivot pin 352. A spherical knob 385 at the junction 386 of the arms 345 and 360 is engaged in the control hole in the control key 285 for controlling the tilt angle of the control key 285 and the inner swash plate 106, thereby controlling the stroke of the pump pistons 90 in the pump cylinder block 80. The knob 385 extends through an elongated slot 390 in the center of the convex cylindrical surface on the central boss 225. The slot 390 is long enough to accommodate the full range of travel of the knob 385 for the designed range of tilt angle of the inner swash plate 106, typically about 10°–15°, and 12.5° in this design.

The tilt angle of the input control bell crank 340 about the pivot pin 352 is controlled by the axial position of the input control ring 380 in the housing 46, which in turn is controlled by the axial position of a control tube 395 shown in FIGS. 2 and 3 and shown in detail in FIGS. 49–51. The control tube 395 has a cylindrical main body 400 and a reduced diameter rear end section 405. A motive wheel 402 trapped between an inwardly extending flange 403 on the housing 46 and a front end cap 404 is splined to the reduced diameter rear end section 405 which enables the wheel 402 to rotate the control tube 395 while permitting axial translation therebetween. The splines are not shown in FIGS. 49–51, for ease of illustration, but are like the splines 565 on the control tube 395 shown in FIG. 64. The motive wheel 402 has a helical groove on its outside peripheral surface for wrapping a braided steel control cable (not shown) which extends through tangential holes in the housing 46. An annular seal lies in an annular groove on each axial face of the wheel 402 to prevent leakage of low pressure hydraulic fluid out of the housing through the cable holes. Pulling on either end of the control cable rotates the motive wheel 402 and rotates the control tube 395.

Two bourrelets 406 and 408 at the two axial ends of the cylindrical main body 400 engage the inside of the housing 46 to guide the axial and rotational movement of the control tube 395 in the housing 46. A pump control cam slot 410 in the cylindrical main body 400 receives a control pin 415 that is pressed in a hole 420 in the housing 46. Rotation of the control tube 395 with the stationary control pin extending into the cam slot 410 causes the control tube to move axially in the housing when the portion of the cam slot engaged with the pin 415 is disposed at a non-perpendicular angle to the axis 115 of the machine. The control tube 395 has an inwardly directed radial flange 425 at the junction of the cylindrical main body 400 and the reduced diameter front end section 405, and the input control ring 380 is trapped between the radial flange 425 and a ring 430, shown in FIG. 3, held in position by a snap ring in a groove 435 in the reduced diameter rear end section 405 of the control tube 395. Axial movement of the control tube 395 in the housing 46 carries with it the input control ring 380, the socket 375 of which is engaged with and moves the ball end 365 of the input control bell crank 340 to adjust the tilt angle of the inner swash plate 106. The input control ring 380 rotates with the output shaft 55 relative to the control tube 395.

A second cam slot 440 in the control tube 395 receives a second control pin 445 pressed into a hole 450 in a concentrically disposed control sleeve 455 shown in FIGS. 2 and 3, and shown in detail in FIGS. 52–55. Rotation and axial movement of the control tube 395 causes complementary axial movement of the control sleeve 455 by virtue of the second control pin 445 engaged in the second cam slot 440. An axial slot 460 in the end of the control sleeve 455 receives a ground pin 465 pressed in a hole in the housing 46. The ground pin 465 engages the edges of the slot to prevent the control sleeve 455 from rotating and to restrict its movement under the influence of the second cam slot 440 in the control tube 395 to axial motion.

The control sleeve 455 has an inwardly extending radial flange 470, shown in FIGS. 2, 3 and 55, against which the output control plate 215 is held by a ring, locked in place by a snap ring 480. The output control plate 215, shown in FIGS. 2, 3, 27 and 28, and shown in detail in FIGS. 56–59, has two lugs 475 to which the link 220 is pinned. The lugs 475 are spaced apart on either side of a top embrasure 485 through which the link 220 extends, as best seen in FIGS. 27 and 28. A bottom embrasure 490 in the output control plate 215 provides clearance for the socket 375 of the input control ring 380 during forward axial movement of the output control plate 215. The output control plate 215 rotates with the output shaft 55.

A torque tube 495, shown in FIGS. 2 and 3, and shown in detail in FIGS. 60–63, is concentrically arranged around the motor cylinder block 165 and extends axially beyond it to slightly beyond the front face of the radial flange 205 of the output swash plate 145. A small shoulder 500 at a step between a large diameter bore 505 and a slightly smaller diameter bore 510 is engaged by a small radial lip 515 on the motor cylinder block 165 and held down thereby against the front surface of the base port plate 155 by the screws (not shown) that hold the motor cylinder block 165 to the base port plate. A spline 520 engages a complimentary rib on the motor cylinder block to prevent the torque tube from turning relative to the motor cylinder block. An axially elongated slot 525 in the forward portion of the torque tube 495 receives the head of a screw 527 threaded into a threaded hole opening in the peripheral edge of the motor wobble plate 185 to react the torque that is exerted on the wobble plate 185 by its interaction with the output swash plate 145.

Figure 46:
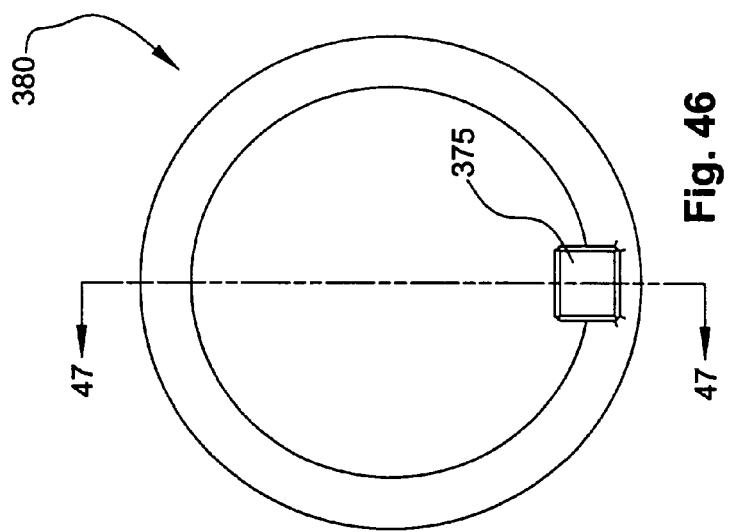
Figure 48:
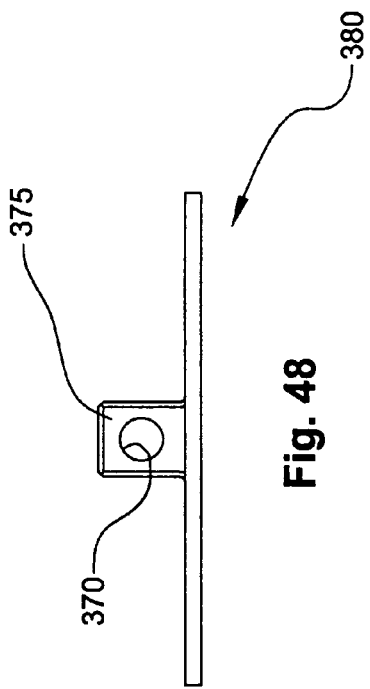

An external placement of the motive wheel, shown in FIGS. 64–46, uses a modified motive wheel 530 mounted for rotation on an axial boss 535 on a modified front end cap 540. An axial flange on the radial outer edge of the end cap 540 is splined on its outside peripheral surface to engage a pinion gear 550 on the outside end of a stub shaft 555 journaled in the end cap 540.

A second pinion gear 560 on the inside end of the stub shaft 555 engages splines 565 on the reduced diameter rear end section 405 of the control tube 395. Rotation of the control tube 395 by the pinion gear 560 causes angular and axial translation of the control tube 395 in the same manner as described for the embodiment of FIGS. 2 and 3, and the operation of the device is in all other respects the same.

In operation, the input shaft 50 is driven by a rotating shaft of the prime mover 35, driving the pump cylinder block 80 to rotate about the central axis 115 of the machine. At the 0° position of the inner swash plate 106, shown in FIGS. 2, 3, 64 and 65, the pump wobble plate 105 rotates in the cup of the inner swash plate 106 around the axis 115 on a normal plane and no axial reciprocation of the pump pistons occurs.

To begin producing output torque in the output shaft 55, the angle of the inner swash plate 106 is adjusted from the 0° position to a small angle, of a few degrees with the inner swash plate angle control mechanism 110. The pump wobble plate 105 nutates as it runs against the tilted surface 270 of the inner swash plate 106, causing the pistons to begin reciprocating in their cylinders 85. Fluid in the cylinders 85 is pressurized and displaced from the cylinders 85 by the pistons 90 moving to the left in FIGS. 2, 3, and 64–46. The pressurized hydraulic fluid is manifolded in the kidney-shaped slot 130 and conveyed through the passages 150-170-175 to the motor cylinders 160. If the output swash plate were adjusted to the 0° position shown in FIGS. 2 and 3, there would be no expanding volume for the fluid from the pump cylinders 85 to flow into, so there would be a rise in fluid pressure and a fluid lock condition resulting in an undesirable 1:1 transmission ration between the input and output shafts. To prevent this undesirable situation, the output swash plate 145 is initially adjusted to a forward standby position shown in FIG. 64, or a reverse standby position shown in FIG. 65, in which the motor wobble plate 185 is at the maximum displacement position. The small displacement from the pump into the maximum displacement setting of the motor will produce a slow, high torque rotation of the output swash plate 145 which is mechanically coupled to the output shaft 55 by engagement of the cylindrical boss 225 in the concave cylindrical surface 235. There is also a small mechanical transmission of torque directly from the pump wobble plate to the inner swash plate 106 resulting from a resolution of axial force exerted by the pistons on the wobble plate into a normal component between the faying surfaces of the wobble plate 105 and the inner swash plate 106 and a lateral component which produces torque on the output swash plate 145.

Continued rotation of the motive wheel 402 (or wheel 530 in the case of FIGS. 64–46) changes the angle of the inner swash plate toward its maximum tilt angle of 12.5° and changes the angle of the output swash plate 145 toward its minimum angle of 0°, resulting in an increasing proportion of the torque transmitted through the machine mechanically from the pump wobble plate 105 through the inner swash plate 106 to output swash plate 145 and the output shaft 55. At maximum displacement of the pump and zero displacement of the motor, the torque is transmitted 100% mechanically from the input shaft through the pump wobble plate 105 and inner swash plate 106 to the output swash plate 145 and the output shaft 55.

The reverse gear, illustrated in FIGS. 65 and 66, operates the same as the forward gear, except that the tilt angle of the two swash plates is reversed so that he rotation of the inner swash plate 106 produces rotation of the output shaft in the opposite direction.

Obviously, numerous modifications and variations of the embodiments described above will occur to those skilled in the art in light of this disclosure. Accordingly, it is expressly to be understood that these modifications and variations, and the equivalents thereof, are to be considered to be within the spirit and scope of the invention as defined in the following claims.

What is claimed is:

1. A continuously variable transmission, comprising:
   a housing having input and output shafts journaled therein for rotation about a central axis;
   drive structure on outer ends of said input and output shafts for torque coupling to a driver and a driven device, respectively;
   an axial piston pump in said housing coupled to said input shaft, and an axial piston motor in said housing coupled to said output shaft by an output coupling;
   said motor includes a swash plate driven in a nutating motion by axial pistons in said motor;
   said output coupling including a central boss on said motor swash plate engaged with a concave surface on said output shaft for providing a torque coupling between said motor swash plate and said output shaft for driving said output shaft from said motor swash plate;
   said axial piston pump and said axial piston motor arranged coaxially and concentrically with respect to each other;
   fluid passages connecting said axial piston pump and said axial piston motor whereby fluid pressurized by said pump drives said motor, and fluid displaced by said motor recirculates to said pump during suction phases of said pump.

2. A method of converting input power in a rotating shaft, in the form of input torque and rotational speed, to output power in an output shaft at a different torque and rotational speed at a power level above about 90% of said input power, comprising:
   rotating an axial piston pump with said input shaft against an inner swash plate, said axial piston pump having axial cylinders in which pump pistons are received for axial motion therein;
   pressurizing fluid in said axial piston pump by tilting said inner swash plate to an oblique angle relative to a central axis of rotation and causing said pump pistons to move axially in said pump cylinders;
   conveying said pressurized fluid through passages in a rotating port plate, rotating at the speed of said output shaft, to axial cylinders in an axial piston motor arranged concentrically with respect to said axial piston pump;
   driving motor pistons axially with said pressurized fluid against a radial flange projecting radially from an output swash plate to exert torque on said output swash plate;
   exerting torque on said output swash plate with said inner swash plate;
   whereby torque is exerted on said output shaft by said inner swash plate driven by said axial piston pump and by said motor acting against said output swash plate.

3. A method as defined in claim 2, further comprising:
   changing said oblique angle of said output swash plate to change said torque and speed of said output shaft.

4. A method as defined in claim 2, further comprising:
   changing said oblique angle of said output swash plate and independently changing the angle of said inner swash plate to change said torque and speed of said output shaft.

5. A continuously variable transmission, comprising:
   a housing;
   an axial piston pump and an axial piston motor in said housing, said motor arranged concentrically with respect to said pump;
   said pump having a pump cylinder block having axial pump cylinders, each receiving a pump piston, and a pump swash plate engaged with said pump pistons for rotating and nutating relative to said pump cylinder block;
   said motor including a motor cylinder block having a motor cylinder block axis and axial motor cylinders parallel to said motor cylinder block axis, each motor cylinder receiving a motor piston, said motor also including a motor swash plate engaged with said motor pistons for rotating and nutating relative to said motor cylinder block;
   an input shaft and an output shaft journaled in said housing for rotation about a central axis;
   said input shaft having an inner end coupled to said pump, and said output shaft having an inner end coupled to said motor swash plate;
   fluid passages between said pump cylinder block and said motor cylinder block for conveying fluid pressurized in said pump to said motor cylinders and for conveying fluid displaced from said motor cylinder block to said pump cylinders;
   whereby said input shaft exerts a first component of torque through said pump to said motor swash plate and said output shaft, and said fluid pressurized in said pump drives said motor pistons against said motor swash plate to exert a second component of torque thereon in the same direction as said first component, combining in a variable ratio to produce output torque in said output shaft.

6. A continuously variable transmission as defined in claim 5, further comprising:
   a mechanism for changing the angle of said motor swash plate relative to said motor cylinder block axis, thereby to change the transmission ratio of said transmission.

7. A continuously variable transmission as defined in claim 5, further comprising:
   a first mechanical linkage for changing the angle of said pump swash plate relative to said central axis, and a second mechanical linkage for changing the angle of said motor swash plate relative to said central axis, whereby said pump and motor swashplate angle can be changed independently of each other to change the transmission ratio of said transmission.

8. A continuously variable transmission as defined in claim 5, wherein:
   said motor cylinder block is fixed immobile relative to said housing and said pump cylinder block is supported for rotation in said housing.

9. A continuously variable transmission as defined in claim 5, wherein:

said pump cylinders and said motor pistons each having piston heads, all of said piston heads having a home position lying in a transverse plane perpendicular to said machine axis when said pump is at zero displacement;

said motor swash plate and said pump swash plate supported in said housing for tilting to desired angles of motor swash plate inclination and pump swash plate inclination about a common axis lying in said transverse plane.

10. A continuously variable transmission as defined in claim 9, wherein:

said motor swash plate has a cylindrical surface engaged with a cylindrical surface on said output shaft whereby said motor swash plate can tilt with respect to said output shaft while remaining in torque driving relationship therewith.

11. A continuously variable transmission as defined in claim 9, further comprising:

a torqued-driving coupling between said input shaft and said pump cylinder block that rotates said pump cylinder block at input shaft speed;

a pump wobble plate engaged with said pump piston heads and having a contact face engaged with said pump swash plate;

whereby rotation of said pump cylinder by said input shaft rotates said pump wobble plate, through said pump pistons, against said pump swash plate, causing said pump pistons to reciprocate in said pump cylinders with a stroke determined by said pump swash plate angle of inclination and also exerting said first component of torque on said pump swash plate and thence to said output shaft, and fluid pressurized in said pump drives said motor pistons against said output swash plate to exert said second component of torque thereon in the same direction as the first component, combining in a variable ratio to produce output torque in the output shaft.

12. A continuously variable transmission as defined in claim 5, further comprising:

a pump port plate disposed between said pump cylinder block and a base port plate fixed to said housing;

a synchronizing member coupled between said motor swash plate and said pump port plate for rotating said pump port plate synchronously with said output shaft;

said fluid passages between said pump cylinder block and said motor cylinder block include two kidney-shaped slots extending through said pump port plate and radially aligned with openings in said base port plate leading to radial passages in said base port plate communicating with openings therein radially aligned with openings in said motor cylinder block to said motor cylinders.

13. A continuously variable transmission as defined in claim 12, wherein:

said synchronizing member includes a synchronizing sleeve radially surrounding said pump cylinder block and having a coupling connection with said output swash plate and a connection with said pump port plate, whereby said pump port plate rotates at said output swash plate speed.

14. A continuously variable transmission as defined in claim 13, wherein:

said coupling connection includes a pair of cylindrical ears engaged in cylindrical sockets in said output swash plate;

whereby said output swash plate can tilt relative to said synchronizing sleeve while remaining in torque transmitting connection thereto to maintain synchronized rotation of said pump port plate regardless of said output swash plate angle of tilt.

* * * * *